(12) United States Patent
Curtis et al.

(10) Patent No.: US 11,438,025 B2
(45) Date of Patent: Sep. 6, 2022

(54) AUDIO SYNCHRONIZATION OF A DUMB SPEAKER AND A SMART SPEAKER USING A SPREAD CODE

(71) Applicant: Roku, Inc., San Jose, CA (US)

(72) Inventors: Robert Caston Curtis, San Jose, CA (US); Mark Ely, San Jose, CA (US); Brian Thoft Moth Møller, San Jose, CA (US)

(73) Assignee: ROKU, INC., San Jose, CA (US)

( * ) Notice: Subject to any disclaimer, the term of this patent is extended or adjusted under 35 U.S.C. 154(b) by 0 days.

(21) Appl. No.: 17/506,801

(22) Filed: Oct. 21, 2021

(65) Prior Publication Data

US 2022/0045715 A1 Feb. 10, 2022

Related U.S. Application Data

(63) Continuation of application No. 17/188,599, filed on Mar. 1, 2021, now Pat. No. 11,177,851, which is a
(Continued)

(51) Int. Cl.
*H04B 1/7087* (2011.01)
*G06F 3/16* (2006.01)
(Continued)

(52) U.S. Cl.
CPC .......... *H04B 1/7087* (2013.01); *G06F 3/165* (2013.01); *H04N 5/073* (2013.01); *H04N 5/607* (2013.01); *H04R 1/028* (2013.01)

(58) Field of Classification Search
CPC ........ H04B 1/69; H04B 1/707; H04B 1/7073; H04B 1/7087; H04B 1/709; H04B 1/7095;
(Continued)

(56) References Cited

U.S. PATENT DOCUMENTS 5,455,822 A 10/1995 Dixon et al.
5,668,601 A 9/1997 Okada et al.
(Continued)

FOREIGN PATENT DOCUMENTS

CN 102694570 A 9/2012
EP 1536582 B1 2/2009
(Continued)

OTHER PUBLICATIONS

International Search Report and Written Opinion of the International Searching Authority directed to related International Patent Application No. PCT/US2019/051249, dated Jan. 17, 2020, 6 pages.
(Continued)

*Primary Examiner* — Young T. Tse
(74) *Attorney, Agent, or Firm* — Sterne, Kessler, Goldstein & Fox P.L.L.C.

(57) ABSTRACT

Disclosed herein are system, apparatus, article of manufacture, method and/or computer program product embodiments, and/or combinations and sub-combinations thereof, for synchronizing playback of audiovisual content with a dumb speaker. In some embodiments, a display device transmits a spread spectrum signal to a dumb speaker over a data channel using a spread spectrum code. The display device then receives the spread spectrum signal from the dumb speaker over an audio data channel. The display device despreads the spread spectrum signal based on the spreading code. The display device determines a time of receipt of the spread spectrum signal. The display device calculates an audiovisual output path delay for the dumb speaker based on the time of receipt and a time of transmission. The display device then synchronizes the playback of the audiovisual content at the dumb speaker and a smart speaker based on the audiovisual output path delay.

20 Claims, 10 Drawing Sheets

Related U.S. Application Data continuation of application No. 16/133,811, filed on Sep. 18, 2018, now Pat. No. 10,958,301.

(51) Int. Cl.
  *H04R 1/02* (2006.01)
  *H04N 5/60* (2006.01)
  *H04N 5/073* (2006.01)

(58) Field of Classification Search
  CPC ........ H04B 1/7097; H04R 1/028; H04N 5/04; H04N 5/073; H04N 5/60; H04N 5/607; G06F 3/147; G06F 3/16; G06F 3/165
  USPC ........ 375/130, 140–142, 144, 145, 148–150; 348/512, 722, 736, 738; 370/208, 335, 370/342; 381/355, 369, 370, 375, 386
  See application file for complete search history.

(56) References Cited

U.S. PATENT DOCUMENTS

| | | | |
|---|---|---|---|
| 5,878,034 A * | 3/1999 | Hershey | H04J 3/0682 370/321 |
| 5,912,644 A | 6/1999 | Wang et al. | |
| 6,141,542 A * | 10/2000 | Kotzin | H04B 7/0684 455/562.1 |
| 6,151,311 A | 11/2000 | Wheatley et al. | |
| 6,173,005 B1 | 1/2001 | Kotzin et al. | |
| 6,522,625 B1 | 2/2003 | Hayashi et al. | |
| 6,865,215 B1 | 3/2005 | Russell et al. | |
| 7,099,379 B2 | 8/2006 | Nuytkens et al. | |
| 7,386,026 B1 | 6/2008 | Gold | |
| 7,392,102 B2 | 6/2008 | Sullivan et al. | |
| 7,565,680 B1 | 7/2009 | Asmussen | |
| 8,117,330 B2 | 2/2012 | Mukaide et al. | |
| 8,620,466 B2 | 12/2013 | Kemp et al. | |
| 8,718,537 B2 | 5/2014 | Sakata et al. | |
| 9,319,782 B1 | 4/2016 | Crump et al. | |
| 9,602,858 B1 | 3/2017 | Kaiser et al. | |
| 9,781,485 B2 | 10/2017 | Russell | |
| 9,817,629 B2 | 11/2017 | Hsieh et al. | |
| 2001/0033602 A1 | 10/2001 | Okubo et al. | |
| 2003/0053521 A1 | 3/2003 | Huang et al. | |
| 2003/0119454 A1 | 6/2003 | Hattori | |
| 2003/0198254 A1 | 10/2003 | Sullivan et al. | |
| 2003/0198255 A1 | 10/2003 | Sullivan et al. | |
| 2003/0198257 A1 | 10/2003 | Sullivan et al. | |
| 2004/0196986 A1 | 10/2004 | Nam | |
| 2004/0264574 A1 | 12/2004 | Lainema | |
| 2005/0181722 A1 | 8/2005 | Kopra et al. | |
| 2006/0044181 A1 | 3/2006 | Wilcox | |
| 2006/0077994 A1 | 4/2006 | Spindola et al. | |
| 2006/0268961 A1 | 11/2006 | Prestwich et al. | |
| 2007/0071123 A1 | 3/2007 | Charbit | |
| 2007/0109175 A1 | 5/2007 | Fukuda | |
| 2007/0177569 A1 | 8/2007 | Lundby | |
| 2007/0224952 A1 | 9/2007 | Goldberg et al. | |
| 2008/0304520 A1 | 12/2008 | Hannuksela et al. | |
| 2009/0003412 A1 | 1/2009 | Negoro et al. | |
| 2009/0015464 A1 * | 1/2009 | Fukuda | G01S 7/35 342/194 |
| 2009/0125961 A1 | 5/2009 | Perlman et al. | |
| 2009/0240826 A1 | 9/2009 | Leblanc et al. | |
| 2009/0298536 A1 | 12/2009 | Ikeda et al. | |
| 2010/0157956 A1 | 6/2010 | Takahashi | |
| 2010/0189128 A1 | 7/2010 | Mizusawa | |
| 2010/0216108 A1 | 8/2010 | Cooperman et al. | |
| 2010/0299712 A1 | 11/2010 | Austin et al. | |
| 2011/0282659 A1 | 11/2011 | Lim et al. | |
| 2012/0257671 A1 | 10/2012 | Brockmann et al. | |
| 2012/0295560 A1 * | 11/2012 | Mufti | H04B 13/00 455/95 |
| 2012/0317594 A1 | 12/2012 | Thorn et al. | |
| 2013/0322348 A1 | 12/2013 | Julian et al. | |
| 2014/0003611 A1 | 1/2014 | Asif et al. | |
| 2014/0056331 A1 | 2/2014 | Nair et al. | |
| 2014/0215535 A1 | 7/2014 | Elliott et al. | |
| 2014/0219317 A1 | 8/2014 | Jeong | |
| 2014/0323036 A1 | 10/2014 | Daley et al. | |
| 2014/0328485 A1 | 11/2014 | Saulters | |
| 2015/0086175 A1 | 3/2015 | Lorenzetti | |
| 2015/0100991 A1 | 4/2015 | Risberg et al. | |
| 2015/0120953 A1 | 4/2015 | Crowe et al. | |
| 2015/0371654 A1 | 12/2015 | Craig et al. | |
| 2016/0021430 A1 | 1/2016 | Labosco et al. | |
| 2016/0234544 A1 | 8/2016 | Huang | |
| 2016/0249262 A1 | 8/2016 | Hirao | |
| 2016/0381436 A1 | 12/2016 | Yu et al. | |
| 2017/0019748 A1 | 1/2017 | Byeong-Geun et al. | |
| 2017/0092290 A1 | 3/2017 | Barkale | |
| 2017/0111490 A1 | 4/2017 | Ma et al. | |
| 2017/0195769 A1 | 7/2017 | Chang et al. | |
| 2017/0208414 A1 | 7/2017 | Lee et al. | |
| 2017/0245079 A1 | 8/2017 | Sheen et al. | |
| 2018/0048502 A1 | 2/2018 | Floch et al. | |
| 2018/0050800 A1 | 2/2018 | Boykin et al. | |
| 2018/0131844 A1 | 5/2018 | Lau | |
| 2018/0146018 A1 | 5/2018 | Chang et al. | |
| 2018/0249273 A1 | 8/2018 | Guangji et al. | |
| 2018/0314483 A1 | 11/2018 | Liu | |
| 2018/0324540 A1 | 11/2018 | Liu et al. | |
| 2019/0158909 A1 | 5/2019 | Kulkarni et al. | |
| 2019/0179597 A1 | 6/2019 | Tull et al. | |
| 2019/0297591 A1 | 9/2019 | Crowe et al. | |
| 2019/0303879 A1 | 10/2019 | Mankovskii et al. | |
| 2019/0318070 A1 | 10/2019 | Mitic et al. | |
| 2019/0326948 A1 | 10/2019 | Hu et al. | |
| 2020/0005830 A1 | 1/2020 | Wasada et al. | |
| 2020/0058317 A1 | 2/2020 | Gaalaas | |

FOREIGN PATENT DOCUMENTS

| | | | |
|---|---|---|---|
| EP | 2129064 A2 | 12/2009 | |
| EP | 2648111 A1 | 10/2013 | |
| EP | 3226570 A1 | 10/2017 | |
| JP | 2011-023992 A | 2/2011 | |
| KR | 10-2009-0122463 A | 11/2009 | |
| KR | 10-1027968 B1 | 4/2011 | |
| KR | 10-2014-0132700 A | 11/2014 | |
| KR | 10-2016-0000577 A | 1/2016 | |
| KR | 10-2018-0090719 A | 8/2018 | |
| WO | WO 99-19742 A1 | 4/1999 | |
| WO | WO 2015/031548 A1 | 3/2015 | |

OTHER PUBLICATIONS

International Search Report and Written Opinion of the International Searching Authority directed to related International Patent Application No. PCT/US2019/051397, dated Jan. 3, 2020, 6 pages.
International Search Report and Written Opinion of the International Searching Authority directed to related International Patent Application No. PCT/US2019/051398, dated Jan. 6, 2020, 9 pages.
European Search Opinion directed to related European Patent Application No. EP2019/0863235, dated May 16, 2022; 7 pages.
Supplementary European Search Report directed to related European Patent Application No. EP2019/0863235, dated May 6, 2022; 2 pages.
European Search Opinion directed to related European Patent Application No. EP2019/0861644, dated Apr. 8, 2022; 3 pages.
Supplementary European Search Report directed to related European Patent Application No. EP2019/0861644, dated Mar. 30, 2022; 5 pages.
European Search Opinion directed to related European Patent Application No. EP2019/0863781, dated May 13, 2022; 5 pages.
Supplementary European Search Report directed to related European Patent Application No. EP2019/0863781, dated May 4, 2022; 2 pages.

* cited by examiner

AUDIO SYNCHRONIZATION OF A DUMB SPEAKER AND A SMART SPEAKER USING A SPREAD CODE

CROSS-REFERENCE TO RELATED APPLICATIONS

This application is a continuation of U.S. patent application Ser. No. 17/188,599, filed Mar. 1, 2021, now allowed, which is a continuation of U.S. patent application Ser. No. 16/133,811, filed Sep. 18, 2018, now U.S. Pat. No. 10,958,301, which is related to U.S. patent application Ser. No. 16/133,797, titled "Audio Cancellation and Content Recognition of Audio Received Over HDMI/ARC," filed Sep. 18, 2018, now U.S. Pat. No. 10,871,935; U.S. patent application Ser. No. 16/133,802, titled "Dynamically Switching To/From a First Network During Audio Playback Over HDMI/ARC," filed Sep. 18, 2018, now U.S. Pat. No. 10,812,751; U.S. patent application Ser. No. 16/133,813, titled "Wireless Audio Synchronization Using A Spread Code," filed Sep. 18, 2018, now U.S. Pat. No. 10,931,909; and U.S. patent application Ser. No. 16/133,817, titled "Identifying Audio Characteristics Of A Room Using A Spread Code," filed Sep. 18, 2018, now U.S. Pat. No. 10,992,336, all of which are herein incorporated by reference in their entireties.

BACKGROUND

Technical Field

This disclosure is generally directed to playback of a spread spectrum signal over an audio data channel to control audiovisual playback.

Background

Users often want to use multiple speakers in their homes. For example, users may want to use multiple speakers in their living rooms so that they can enjoy a surround sound experience. Users may also want to place multiple speakers in different rooms of their home so that they can listen to the same audio content in the different rooms. But many users may have not purchased multiple speakers for their homes. This is due to a variety of reasons.

First, many speakers connect to a home audio system using physical cables. But users often do want to run physical cables throughout their homes. Second, each speaker in a multiple speaker system may need to be manually calibrated by a user to provide an adequate listening experience. This is often error prone and tedious.

In response to these technological problems, companies have introduced smart speaker systems. These smart speaker systems can connect to an audio system using a wireless communication protocol. This means users do not have to run physical cables throughout their homes. Moreover, unlike early wireless speaker systems, these smart speaker systems use high bandwidth, low latency wireless communication protocols such as Institute of Electrical and Electronics Engineers (IEEE) 802.11 or BlueTooth to ensure high quality audio playback.

These smart speakers often provide other benefits. For example, each smart speaker in a smart speaker system can share a common clock for audio playback. This ensures that each smart speaker in the smart speaker system outputs the same audio sample at the same time. In addition, many smart speakers provide voice-activated digital assistants. This enables the smart speaker to perform various functions in response a voice input from a user.

But there are still many technical problems associated with using smart speakers. First, users typically want to synchronize the playback of audio content across each smart speaker. If one smart speaker is not synchronized with other speakers, the user may hear erratic playback of the audio content. But sharing a common clock at each smart speaker is often not sufficient to ensure synchronized playback. This is because there may be a different playback delay at each smart speaker.

Second, a smart speaker may provide a voice-activated digital assistant. The effectiveness of a voice-activated digital assistant often depends on accurate voice recognition. But accurate voice recognition may not be possible when echo is captured as part of a voice input from a user. A smart speaker can attempt to remove the echo from the captured voice input using various echo cancellation algorithms. To remove the echo from the captured voice input, the smart speaker may need to determine how long after outputting an audio signal until it reappears in the captured voice input. But conventional smart speakers may not reliably determine this echo delay.

Third, users may want to connect a dumb speaker (e.g., a non-smart speaker) to a smart speaker system. For example, a user may want to connect a sound bar to a television having smart speaker functionality. But the smart speaker system may not be able to synchronize playback of audio content across the sound bar and each smart speaker in the smart speaker system because it cannot determine the playback delay associated with the sound bar. Similarly, a user may want to connect a television without smart speaker functionality to a media device that is connected to a smart speaker. But the smart speaker system may not be able to synchronize playback of audio content across the television and each smart speaker in the smart speaker system because it cannot determine the playback delay associated with the television.

Fourth, users may want to optimize playback for a location in a room with multiple speakers. But conventional smart speakers systems are unable to automatically optimize playback for a particular location in a room with multiple speakers.

Finally, users may want to ensure that a listening experience is specific to a particular room in their home. For example, a user may have speakers in their living room, kitchen, and bedroom. When the user is in the living room, they may not want audio content to be played at the speakers in the kitchen and bedroom. But conventional solutions are unable to automatically identify what speakers are present in a room, let alone adjust the listening experience based on what speakers are present in the room.

SUMMARY

Provided herein are system, apparatus, article of manufacture, method and/or computer program product embodiments, and/or combinations and sub-combinations thereof, for synchronizing playback of audiovisual content among multiple speakers. Some embodiments operate to receive, at a first smart speaker, a spread spectrum signal from a second smart speaker over an audio data channel. The first smart speaker despreads the spread spectrum signal based on a spreading code. The first smart speaker determines a time of receipt of a specific chip (or sample) in the spreading code based on a local clock of the first speaker and the despreading operation. The first smart speaker receives a time of transmission of the spread spectrum signal by decoding data in the audio transmission or using a separate data channel such as IEEE 802.11 ("WiFi") or Bluetooth. The first smart speaker then calculates a playback delay based on the time of receipt and the time of transmission. Then the first smart speaker controls the playback of the audiovisual content based on the playback delay. Also described herein are embodiments for performing an echo delay calculation. For example, some embodiments operate to perform echo cancellation on a voice input based on the playback delay.

Also described herein are embodiments for synchronizing playback of audiovisual content between a smart speaker and a dumb speaker (e.g., a non-smart speaker). Some embodiments operate to transmit, at a display device, a spread spectrum signal to a dumb speaker over a data channel (e.g., High Definition Multimedia Interface (HDMI) Audio Return Control (ARC)) at a time of transmission using a spread spectrum code. The display device then receives the spread spectrum signal from the dumb speaker over an audio data channel. The display device despreads the spread spectrum signal based on the spreading code. The display device determines a time of receipt of the spread spectrum signal. The display device calculates an audiovisual output path delay for the dumb speaker based on the time of receipt and the time of transmission. The display device then synchronizes the playback of the audiovisual content at the dumb speaker and a smart speaker based on the audiovisual output path delay of the dumb speaker.

Also described herein are embodiments for adjusting playback of audiovisual content at a location in a room. Some embodiments operate to receive, at an audio responsive remote control at a location, a spread spectrum signal from a smart speaker over an audio data channel. The audio responsive remote control despreads the spread spectrum signal based on a spreading code. The audio responsive remote control determines a time of receipt of the spread spectrum signal based on the despreading. The audio responsive remote control receives a time of transmission of the spread spectrum signal. The audio responsive remote control calculates an airtime delay associated with the smart speaker based on the time of receipt and the time of transmission. The audio responsive remote control then adjusts the playback of audiovisual content at the smart speaker and a second smart speaker for the location based on the airtime delay. The use of separate orthogonal spreading codes allows a single microphone to measure the delay from multiple speakers simultaneously.

Also described herein are embodiments for automatically identifying speakers in the same room. Some embodiments operate to receive, at an audio responsive remote control in a room, a spread spectrum signal from a smart speaker over an audio data channel. The audio responsive remote control despreads the spread spectrum signal based on a spreading code. The audio responsive remote control determines a time of receipt of the spread spectrum signal based on the despreading. The audio responsive remote control receives a time of transmission of the spread spectrum signal. The audio responsive remote control calculates a distance between it and the smart speaker based on the time of receipt and the time of transmission. The audio responsive remote control then determine whether the smart speaker is present in the room with it based on the distance.

This Summary is provided merely for purposes of illustrating some example embodiments to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
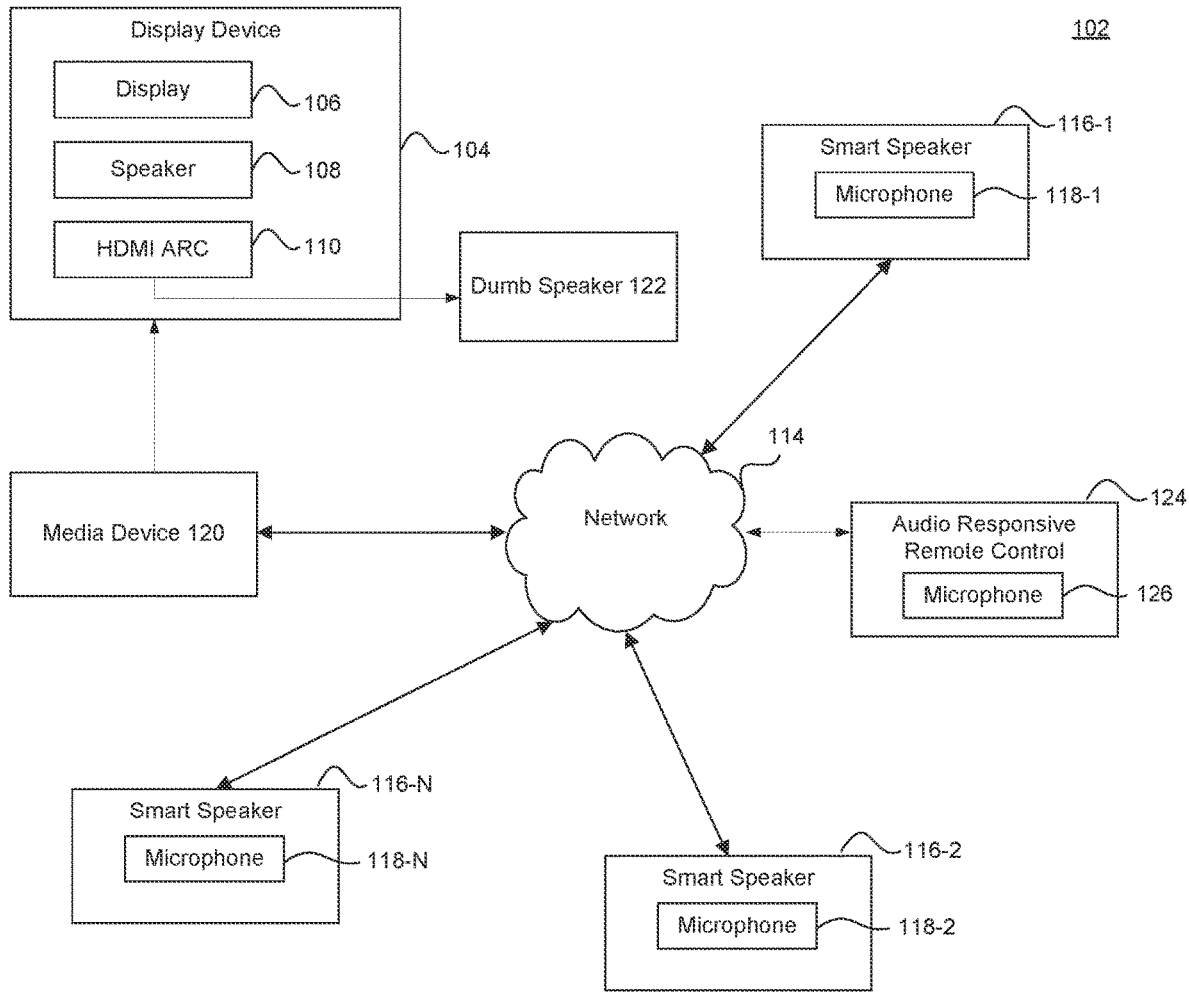
FIG. 1 illustrates a block diagram of an example media system, according to some embodiments.

Provided herein are system, apparatus, device, method and/or computer program product embodiments, and/or combinations and sub-combinations thereof, for controlling audiovisual playback based on playback of a spread spectrum signal over an audio data channel.

Users often want to use multiple speakers in their homes. For example, users may want to use multiple speakers in their living rooms so that they can enjoy a surround sound experience. Users may also want to place multiple speakers in different rooms of their home so that they can listen to the same audio content in the different rooms.

Despite these benefits, many users have not been interested in purchasing multiple speakers for their homes. But this has changed with the introduction of smart speaker systems. These smart speaker systems can connect to an audio system using a wireless communication protocol. This means users do not have to run physical cables throughout their homes. Moreover, unlike early wireless speaker systems, these smart speaker systems use high bandwidth, low latency wireless communication protocols such Institute of Electrical and Electronics Engineers (IEEE) 802.11 or BlueTooth to ensure high quality audio playback. Finally, these smart speakers often provide other benefits. For example, each smart speaker in a smart speaker system can share a common clock for audio playback. This ensures that each smart speaker in the smart speaker system outputs the same audio sample at the same time. In addition, many smart speakers provide voice-activated digital assistants. This enables a smart speaker to perform various functions in response to a voice input from a user.

But many users are still reluctant to purchase smart speaker systems for their homes. This is because there are still many technical problems associated with using smart speakers in a home.

First, users typically want to synchronize the playback of audio content across each smart speaker. Conventional smart speaker systems may use a common clock for audio playback. For example, conventional smart speaker systems may synchronize the clocks of each smart speaker in the smart speaker system over a wireless connection. But synchronizing the clocks of each smart speaker may not ensure synchronized playback. This is because there may be a delay associated with transmitting the audio content across the wireless connection to each smart speaker. In addition, each smart speaker may have a different audio path delay. As a result, each smart speaker may not output audio content at the same time despite sharing a common clock.

Moreover, users may want to synchronize the playback of audio content across both dumb speakers (e.g., non-smart speakers) and smart speakers. But conventional solutions may not be able to synchronize the playback of audio content across both dumb speakers and smart speakers. This is because conventional solutions may not be able to determine the audio path delay of the dumb speaker.

Second, a smart speaker may provide a voice-activated digital assistant. The effectiveness of a voice-activated digital assistant often depends on accurate voice recognition. But accurate voice recognition may not be possible when echo is captured as part of a voice input from a user. A smart speaker can attempt to remove the echo from the captured voice input using various echo cancellation algorithms. To remove the echo from the captured voice input, the smart speaker may need to determine how long after outputting an audio signal until it reappears in the captured voice input. But conventional solutions often cannot remove this echo from the captured audio because they cannot correlate the time delay between the speaker and microphone.

Third, users may want to optimize playback for a location in a room with multiple speakers. For example, a user may want sound outputted from each speaker to reach their ears at the same. This often requires knowing the airtime delay from each speaker to the location in the room. But conventional solutions are unable to automatically determine the airtime delay from each speaker to the location in the room. As a result, conventional solutions are unable to optimize playback for the location in the room. It is noted that, herein, the terms optimize, optimizing and the like include both optimal and non-optimal (but improved) solutions.

Finally, users may want to optimize a listening experience for a particular room in their home. For example, a user may have speakers in their living room, kitchen, and bedroom. When the user is in the living room, they may not want audio content to be played at the speakers in the kitchen and bedroom. But this situation may occur when the user moves a portable smart speaker from one room to another. For example, the user may normally have a portable smart speaker in the living room. But when the user moves the portable smart speaker to the bedroom, the user may not want audio content to be played back at the portable smart speaker in the bedroom when listening to the audio content in the living room. But conventional solutions are unable to automatically identify what speakers are present in a room, let alone adjust the listening experience based on what speakers are present in the room.

FIG. 1 illustrates an example media system 102, according to some embodiments. The above technological problems, and embodiments providing technological solutions to these technological problems, are discussed with reference to FIG. 1.

Media system 102 may include a display device 104 (e.g. monitors, televisions, computers, phones, tablets, projectors, etc.), a media device 120 (e.g. streaming devices, multimedia devices, audio/video playback devices, etc.), one or more smart speakers 116, one or more dumb speakers 122, and an audio responsive remote control 124.

Media system 102 may also include one or more content sources. The content sources may store music, videos, movies, TV programs, multimedia, images, still pictures, text, graphics, gaming applications, advertisements, software, and/or any other content in electronic form. For example, a content source can be Netflix or Hulu.

Media system 102 may include media device 120. Media device 120 can be a part of, integrated with, operatively coupled to, and/or connected to display device 104. Media device 120 can be configured to communicate with network 114. In some embodiments, network 114 can include, without limitation, wired and/or wireless intranet, extranet, Internet, cellular, Bluetooth and/or any other local, short range, ad hoc, regional, global communications network, as well as any combination thereof.

Media device 120 may include one or more applications. An application may interact with a content source over network 114 to select content, such as a movie, TV show, or song. As would be appreciated by a person of ordinary skill in the art, an application may also be referred to as a channel.

Media system 102 may include an audio responsive remote control 124. Audio responsive remote control 124 may receive audio commands from a user or another source of audio commands (such as but not limited to the audio outputted by speaker 108 of display device 104). Audio responsive remote control 124 may include a microphone 126 to receive audio commands from a user. Audio responsive remote control 124 may transmit control signals corresponding to such audio commands to media device 120, display device 104, and/or any other component in media system 102, to cause the media device 120, display device 104, and/or other component to operate according to the audio commands.

Media system 102 may include one or more smart speakers 116. A smart speaker 116 may be a wireless speaker that receives audio signals over-the-air using radio frequencies (RF) rather than over audio wires or cables. A smart speaker 116 can include an RF receiver and an RF transmitter. A smart speaker 116 can be configured to communicate with media device 120, display device 104, and/or any other component in media system 102 over network 114.

A smart speaker 116 can receive audio data from media device 120, display device 104, and/or any other component in media system 102 over network 114. One or more smart speakers 116 of media system 102 can share a common clock. The one or more smart speakers 116 can also share a common clock with media device 120, display device 104, and/or any other component in media system 102. Media system 102 can synchronize the common clock across the one or more smart speakers 116, display device 104, and/or any other component in media system 102 using network 114. Media system 102 can use the common clock to play the same audio content at smart speakers 116, display device 104, and/or any other component in media system 102 at the same time.

In some embodiments, a smart speaker 116 may be a voice-enabled smart speaker. A voice-enabled smart speaker can refer to a smart speaker that can be coupled to a voice command device with integrated voice-recognition software. The voice-recognition software can process audio commands from a user to perform a task or service, allowing the user to vocally interact with the smart speaker and activate functionality hands-free. A smart speaker 116 may include a microphone 118 to receive the audio commands from a user.

In some embodiments, a smart speaker 116 may transmit control signals corresponding to such audio commands to media device 120, display device 104, and/or any other component in media system 102, to cause the media device 120, display device 104, and/or other component to operate according to the audio commands.

In some embodiments, a user may use audio responsive remote control 124 to interact with media device 120 to select content, such as a movie, TV show, or song. In some other embodiments, the user may use a smart speaker 116 to interact with media device 120 to select content, such as a movie, TV show, or song. The user may use audio responsive remote control 124 or a smart speaker 116 to interact with an application on media device 120 to select content. Media device 120 can request the selected content from a content source over the network 114. In some embodiments, an application requests the selected content from the content source. The content source can then transmit the requested content to media device 120. Media device 120 can transmit the content to display device 104, one or more smart speakers 116, and one or more dumb speakers 122 for playback.

In some embodiments, media device 120 can transmit the content to display device 104. In some embodiments, display device 104 can output the content using display 106 and/or speakers 108. In some other embodiments, display device 104 can output the content to dumb speaker 122 over HDMI ARC 110.

In some embodiments, display device 104 may have smart speaker functionality. For example, display device 104 may be configured to communicate with smart speakers 116 over network 114. Display device 104 may also share a common clock with smart speakers 116.

Display device 104 can include a display 106 and speaker 108. Display device 104 can optionally include a microphone. Display device 104 may receive and respond to commands from media device 120 and/or audio responsive remote control 124 to control the operation of display device 104, such as selecting a source, varying audio and/or video properties, adjusting volume, powering on and off, to name just a few examples.

Display device 104 can be configured to output audio content to dumb speaker 122. A dumb speaker can refer to a speaker that receives audio signals over audio wires or cables. For example, in FIG. 1, dumb speaker 122 can be a sound bar. Display device 104 can output audio content using dumb speaker 122 instead of speaker 108.

In some embodiments, display device 104 can output the audio content to dumb speaker 122 over HDMI ARC 110. As would be appreciated by a person of ordinary skill in the art, display device 104 can output the audio content to dumb speaker 122 over various other data channels such as an audio jack channel, a RCE channel, or an optical channel.

The above mentioned technological problems, and embodiments providing technological solutions to these technological problems, are discussed in turn with reference to FIG. 1.

A discussed above, each smart speaker 116 can share a common clock that controls when to output an audio sample. During playback, if the clocks of the smart speakers 116 are not synchronized, the smart speakers 116 may not output the same audio content at the same time. Thus, conventional solutions can involve synchronizing the clocks of the smart speakers 116 over a network (e.g., network 114). For example, a common clock value may be transmitted to each smart speaker 116.

But synchronizing the clocks of the smart speakers 116 over network 114 may not ensure synchronized playback. This is due to a variety of reasons. First, there may be a variable transmission delay when transmitting over network 114. This transmission delay can cause playback of audio content at the smart speakers 116 not to be synchronized. Second, even if network 114 provides a constant transmission delay, each smart speaker 116 can have an individual audio output path delay. The audio output path delay of a smart speaker 116 can represent the amount of time after triggering the output of audio content until that same audio content is actually outputted by the speaker. This audio output path delay can be different for each smart speaker 116. Moreover, this audio output path delay may be unable to be determined for each smart speaker 116. These different audio path delays can cause the playback of audio content across the smart speakers 116 to not be synchronized.

In some embodiments, this technological problem can be solved by playing a spread spectrum signal over an audio data channel to synchronize the playback of different smart speakers 116. This enables each smart speaker 116 to output the same audio sample at the same time.

For example, smart speaker 116-1 can play a spread spectrum signal over an audio data channel to synchronize playback with smart speaker 116-2. Smart speaker 116-1 can generate the spread spectrum signal by continuously applying a spreading code to a base signal. After playing the spread spectrum signal, smart speaker 116-1 can transmit a time of transmission for when it played the spread spectrum signal to smart speaker 116-2.

Smart speaker 116-2 can receive the spread spectrum signal using microphone 118-2. Smart speaker 116-2 can then despread the spread spectrum signal. This enables smart speaker 116-2 to determine a time of receipt of the spread spectrum signal. Smart speaker 116-2 can also receive the time of transmission of the spread spectrum signal from smart speaker 116-1. Smart speaker 116-2 can determine a playback delay at smart speaker 116-1 based on the time of receipt of the spread spectrum signal and the time of transmission of the spread spectrum signal. Smart speaker 116-2 can use the playback delay to synchronize the playback of audiovisual content across smart speakers 116-1 and 116-2.

The basis for embodiments providing technological solutions to the above technological problems is a spreading code. A spreading code can be a pseudorandom sequence of bits that is applied to a base signal to produce a spread spectrum signal. In other words, a spreading code can be the basis of spread spectrum communication. In some embodiments, a spreading code can be unique to a given device.

Spread spectrum communication is a technique for transmitting electromagnetic signals such as radio or audio signals. Spread spectrum communication can involve spreading a transmitted signal across the entire frequency spectrum available for transmission. This can result in a transmitted signal with a wider bandwidth. In other words, the transmitted signal can have a bandwidth considerably larger than the frequency content of the original information.

Spread spectrum communication can be used for a variety of reasons. For example, spread spectrum communication techniques can enable secure communication. This is because a low probability of intercept of a spread spectrum signal. Spread spectrum communication can be resilient to natural interference, noise, and jamming. This is because the transmitted signal can be spread across the frequency domain. Spread spectrum communication can be hidden below the noise level. For example, spread spectrum techniques can be used to transmit an audio signal below the human ear hearing level. As a result, users do not hear the transmission but devices that know what they are looking for can pull out the underlying data from the spread spectrum signal. These characteristics can make spread spectrum communication advantageous for the embodiments discussed herein.

In spread spectrum communication, a spreading code can be used to spread a base signal over the frequency domain. In other words, the spreading code can spread a single data bit over a longer sequence of transmitted data bits.

A spreading code can be applied to various types of base signals. For example, a spreading code can be applied to a base signal modulated using Binary Phase Shift Keying (BPSK). As would be appreciated by a person of ordinary skill in the art, a spreading code can be applied to a base signal modulated using various other techniques.

To generate a spread spectrum signal that carries information, a spreading code can be injected somewhere into the base signal prior to transmission. This injection is often called a spreading operation. The effect of the spreading operation is to diffuse the information in a larger bandwidth.

Conversely, the spreading code can be removed from the spread spectrum signal at a receiving device to recover the original information. This is often called the despreading operation. This can also be referred to as correlation. The despreading operation can recover the original information. The despreading operation can also remove any noise from the spread spectrum signal.

In order to recover the original information, the transmitting device and the receiving device can share the same spreading code. When the same spreading code is used at the transmitting device and the receiving device, the spreading code can be said to have a correlation of one. This means the original information can be extracted from the spread spectrum signal. In contrast, when a spreading code that does not correlate is used, the original information may not be extracted. Instead, a different set of data can appear. In other words, the output of a correlation operation at a receiving device is approximately zero for all except the desired transmission.

The use of spread spectrum communication provides many advantages when used with embodiments that involve the determination of delays of smart speakers 116 and/or other components in media system 102. First, spread spectrum communication can be resistant to interference. Second, spread spectrum communication can be resistant to interception. Receiving devices that do not have the spreading code used to spread the base signal cannot decode it. In other words, the spread-spectrum signal can appear as noise to a receiving device that does not have the spreading code. Third, spread spectrum communication can be hidden below the noise floor. This is because the spreading operation can reduce the spectral density. Finally, a spread spectrum communication can be generated with minimal delay. Specifically, a spreading code can be applied to a base signal with minimal delay. For example, the spreading code can be multiplied by the base signal.

As discussed, a main characteristic of spread spectrum communication is the use of a spreading code. A spreading code can be a sequence of bits. As would be appreciated by a person of ordinary skill in the art, a spreading code may be as random and long as possible to appear "noise-like." However, the spreading code must remain reproducible so that a receiving device can extract the original information from the spread spectrum signal. Thus, the spreading code can be "nearly random." In other words, the spreading code can be a pseudorandom sequence of bits. As would be appreciated by a person of ordinary skill in the art, various methods can used to generate the pseudorandom sequence of bits including, but not limited to, a feedback shift register technique.

A spreading code can be made more reliable by making the code orthogonal. An orthogonal spreading code can mean that there is no self-correlation with the spreading code. In other words, any two sequences of the spreading code do not correlate together. As a result, a despreading operation cannot be performed with two different portions of the spreading code.

Wireless Audio Synchronization Using a Spread Code

As discussed above, a spreading code can be used as part of an embodiment to calculate a playback delay at a smart speaker 116. The calculated playback delay can be used to synchronize the playback of audiovisual content across smart speakers 116. This embodiment is discussed with reference to FIG. 1.

In FIG. 1, there can be multiple smart speakers 116. Each smart speaker 116 can be commutatively coupled to network 114. Network 114 can use a wireless communication protocol such as IEEE 802.11 or BlueTooth. Each smart speaker 116 can receive audio content over network 114. Each smart speaker 116 can also share a common clock. Each smart speaker 116 can use the common clock to output the same audio sample at the same time. For each smart speaker 116, however, there may be a playback delay between transmission of the audio content to the smart speaker 116, and actual output of the audio content by the smart speaker 116. This playback delay can vary between each smart speaker 116. This playback delay can cause one or more of smart speakers 116 to not play back the same audio sample at the same time. Thus, even if each smart speaker 116 shares a synchronized clock, one or more of smart speakers 116 may output the same audio at different times.

Conventional solutions do not provide a way to determine the playback delay of a smart speaker 116. But this technological problem can be solved by playing a spread spectrum signal over an audio data channel to calculate a playback delay of a smart speaker 116. This calculated playback delay can be used to synchronize the playback of the smart speakers 116.

In some embodiments, and by way of example, media system 102 can determine a playback delay at smart speaker 116-1. To determine the playback delay, smart speaker 116-1 can generate an audio base signal. The audio base signal can be modulated using Binary Phase-shift Keying (BPSK).

After generating the audio base signal, smart speaker 116-1 can continuously apply a spreading code to the audio base signal before outputting the signal to smart speaker 116-2. For example, smart speaker 116-1 can apply the spreading code to the audio base signal by multiplying the audio base signal by the spreading code.

The spreading code can loop after a period of time. For example, the spreading code can be loop every second. Thus, every second, the spreading code is applied anew against the audio base signal. The spreading code can be pseudorandom sequence of bits. The spreading code can also be orthogonal.

By way of example, smart speaker 116-1 can generate a spreading code of 16 kilobits. Smart speaker 116-1 can apply the spreading code to an audio base signal. Smart speaker 116-1 can loop the spreading code every second. For example, every second, the zeroth bit of the spreading code can be applied to an audio sample. As would be appreciated by a person of ordinary skill in the art, the choice of audio sample to correlate on can be configurable. Moreover, as would be appreciated by a person of ordinary skill in the art, the length of spreading code and the repeat frequency can be configurable depending on various constraints and factors.

Smart speaker 116-1 can apply the spreading code to the base audio signal by multiplying the base audio signal by the spreading code. As would be appreciated by a person of ordinary skill in the art, this can be useful because multiplication can be performed very fast. For example, smart speaker 116-1 may receive audio at microphone 118-1 at 16,000 samples per second (16 kHz). Because the multiplication process can be performed very fast, smart speaker 116-1 can multiply the base audio signal by a spreading code having 16,000 bits every second. This can provide good alignment for performing the despreading operation at smart speaker 116-2.

In some embodiments, the spreading code can be orthogonal. In this case, when smart speaker 116-2 uses the spreading code to despread the spread spectrum signal, the spreading code can only match at a particular spot. In other words, the spreading code can correlate only at a particular audio sample. This can enable smart speaker 116-2 to identify exactly when it receives a particular audio sample from smart speaker 116-1.

In some embodiments, smart speaker 116-2 can identify when it receives a particular audio sample using a sliding window technique. Specifically, smart speaker 116-2 can select a sliding window into the spreading code based on a reference point. Smart speaker 116-2 can then move the sliding window over a received audio sample. As would be appreciated by a person of ordinary skill in the art, the sliding window into the spreading code will correlate only at a particular audio sample. For example, if the reference point is the zeroth bit for zeroth audio sample, then the spreading code will only match the zeroth audio sample at the zeroth bit. Thus, using an orthogonal spreading code, smart speaker 116-2 can accurately identify a time of receipt of a particular audio sample from smart speaker 116-1.

To calculate the playback delay at smart speaker 116-1, the time of receipt of the particular audio sample can be compared to a time of transmission of the particular audio sample from smart speaker 116-1. In some embodiments, smart speaker 116-1 can transmit the time of transmission of the particular audio sample to smart speaker 116-2. The time of transmission can be a timestamp of the synchronized clock of smart speaker 116-1 when smart speaker 116-1 sent the particular audio sample to smart speaker 116-2. For example, smart speaker 116-1 can generate a timestamp of when it sent out the zeroth audio sample to smart speaker 116-2. Smart speaker 116-1 can then encode the timestamp and send it to smart speaker 116-2. Smart speaker 116-1 can send the encoded timestamp shortly after transmitting the corresponding audio sample to smart speaker 116-2. In some embodiments, smart speaker 116-1 can send the encoded timestamp using the audio data channel. In other words, smart speaker 116-1 can send the encoded time stamp using a spread spectrum signal. In some other embodiments, smart speaker 116-1 can send the encoded timestamp over network 114. As would be appreciated by a person of ordinary skill in the art, smart speaker 116-1 can send the encoded timestamp to smart speaker 116-2 using various other techniques.

By way of example, where the reference point is the zeroth bit for the zeroth audio sample, smart speaker 116-1 can send out the zeroth audio sample followed by a timestamp of the zeroth audio sample. Smart speaker 116-2 can receive the zeroth audio sample in the spread spectrum signal. Smart speaker 116-2 can then slide the spreading code over the received audio sample to determine if it is the zeroth audio sample. Smart speaker 116-2 can have its own timestamp for receipt of the zeroth audio sample. As would be appreciated by a person of ordinary skill in the art, this timestamp should ideally be the same as the timestamp of the synchronized clock of smart speaker 116-1 when smart speaker 116-1 sent the zeroth audio sample to smart speaker 116-2.

Smart speaker 116-2 can determine a playback delay of smart speaker 116-1 by calculating the difference between the received time of transmission of the zeroth audio sample and its own time of receipt of the zeroth audio sample. As would be appreciated by a person of ordinary skill in the art, media system 102 can calculate the playback delay of smart speaker 116-1 at any other component in media system 102. The playback delay at smart speaker 116-1 can include the airtime delay of the audio signal, the audio path delay of smart speaker 116-1, and/or whatever error in there is in the synchronization of the clocks of the smart speakers 116.

As discussed above, to perform despreading at smart speaker 116-2, both smart speaker 116-1 and smart speaker 116-2 share a common spreading code. For example, both smart speaker 116-1 and smart speaker 116-2 can share a spreading code having a common length, bit sequence, and repeat rate (e.g., every second). In addition, to perform despreading at smart speaker 116-2, both smart speaker 116-1 and smart speaker 116-2 need to agree on a common reference point to do the correlation (e.g., the zeroth sample).

In some embodiments, the spreading code being used, and the sample number to correlate to, are pre-agreed upon between smart speaker 116-1 and smart speaker 116-2. In some other embodiments, the spreading code being used, and the sample number to correlate to, can be communicated to smart speaker 116-1 and smart speaker 116-2. In some embodiments, the spreading code, and sample number to correlate to, can be communicated over the audio data channel. In some other embodiments, the spreading code, and sample number to correlate to, can be communicated over network 14.

As discussed above, smart speaker 116-2 can determine what audio sample was received by selecting a sliding window into the spreading code based on a reference point. For example, if smart speaker 116-2 is configured to correlate to the zeroth audio sample, smart speaker 116-2 can select a sliding window into the spreading code that begins at bit 0. Similarly, if smart speaker 116-2 is configured to correlate to the $37^{th}$ audio sample, smart speaker 116-2 can select a sliding window into the spreading code that begins at the bit associated with the $37^{th}$ audio sample. After smart speaker 116-2 has selected a sliding window for the spreading code, smart speaker 116-2 can despread the spreading spectrum signal from smart speaker 116-1.

In some embodiments, after calculating the playback delay of smart speaker 116-1, a "master device" of media system 102 can control the playback of audiovisual content at the smart speakers 116 based on the playback delay. As would be appreciated by a person of ordinary skill in the art, the master device can be a smart speaker 116, audio responsive remote control 124, media device 120, display device 104, and/or any other component communicatively coupled to smart speakers 116 over network 114.

In some embodiments, the master device can synchronize the clocks at each smart speaker 116. The "master" device can also synchronize the clocks of each smart speaker 116 with any other component in media system 102 that has smart speaker functionality (e.g., display device 104).

In some embodiments, the master device can also control the playback of audiovisual content at smart speakers 116 based on the playback delay. For example, media system 102 can calculate the playback delay at each smart speaker 116. After calculating the playback delays across each smart speaker 116, the master device can control how audiovisual content is output across each smart speaker 116. Specifically, the master device can synchronize the playback of the audiovisual content across each smart speaker 116. As would be appreciated by a person of ordinary skill in the art, the master device can only cause a smart speaker 116 to delay its output.

In some embodiments, the master device can cause different smart speakers 116 to delay their output so that they are in line with other smart speakers 116. For example, the master device may determine the longest playback delay across all smart speakers 116. The master device can then cause each smart speaker 116 to delay its output for at least the determined longest playback delay.

The master device can cause each smart speaker 116 to delay its output using various techniques as would appreciated by a person of ordinary skill in the art. In some embodiments, the master device can change an amount of audiovisual content to buffer at a smart speaker 116 based on how much to delay the output. In some other embodiments, the master device can change a playback offset for the audiovisual content at a smart speaker 116 based on how much to delay the output.

In some embodiments involving playing a spread spectrum signal over an audio data channel to synchronize the playback of smart speakers 116, the playback synchronization process can be performed at boot up of one or more of the smart speakers 116. In some other embodiments, the playback synchronization process can be performed as needed. For example, if media system 102 detects a high amount of errors in network 114, media system 102 can trigger the playback synchronization process to restore playback synchronization among the smart speakers 116.

In some embodiments, the playback synchronization process can be performed to restore playback synchronization among the smart speakers 116 even during playback of audiovisual content at the smart speakers 116. The playback synchronization process can be performed without noticeably disrupting the playback of the audiovisual content at the smart speakers 116. This is because when the spreading code is applied to audio base signal, the resulting spread spectrum signal is barely audible to a user.

Figure 2:
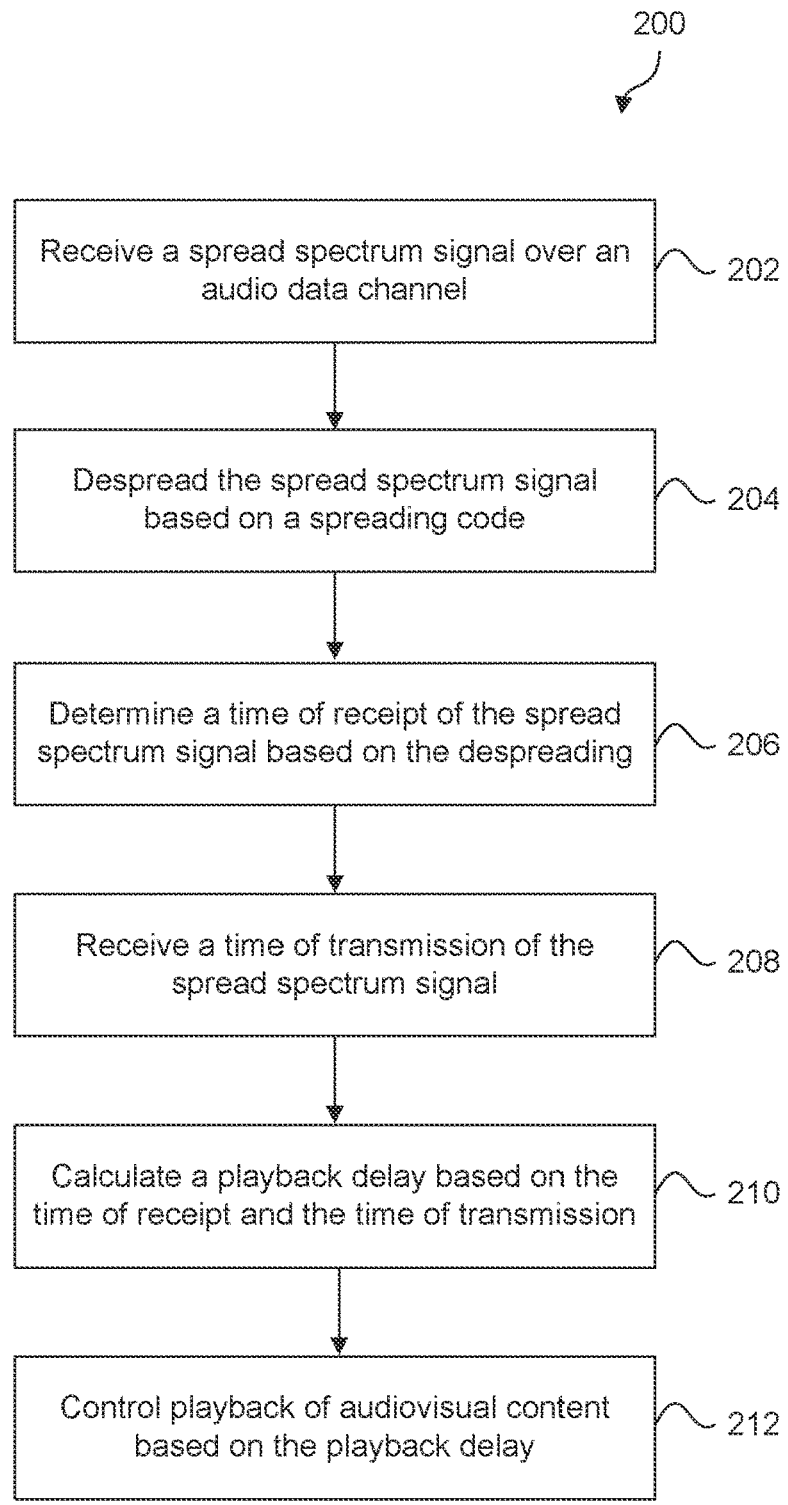
FIG. 2 illustrates a flowchart for synchronizing playback of audiovisual content across multiple smart speakers, according to some embodiments.

FIG. 2 illustrates a method 200 for synchronizing playback of audiovisual content across multiple smart speakers, according to some embodiments. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art.

For illustrative and non-limiting purposes, method 200 shall be described with reference to FIG. 1. However, method 200 is not limited to those examples.

In 202, smart speaker 116-2 receives a spread spectrum signal from smart speaker 116-1. The spread spectrum signal is received over an audio data channel. In some embodiments, smart speaker 116-2 receive the spread spectrum signal at boot up of smart speaker 116-1. In some other embodiments, smart speaker 116-2 receives the spread spectrum signal in response to a user command. In some other embodiments, smart speaker 116-2 receive the spread spectrum signal when media system 102 encounters a threshold amount of network 114 synchronization errors.

In 204, smart speaker 116-2 despreads the spread spectrum signal based on a spreading code. The spreading code can be exchanged between smart speaker 116-2 and smart speaker 116-1 in advance of 202. Smart speaker 116-2 can despread the spread spectrum signal based on a reference point associated with the spreading code. For example, smart speaker 116-2 can despread based on sample 0. Smart speaker 116-2 can perform the despread using a sliding window.

In 206, smart speaker 116-2 determines a time of receipt of the spread spectrum signal based on the despreading.

In 208, smart speaker 116-2 receives a time of transmission of the spread spectrum signal from smart speaker 116-1. In some embodiments, smart speaker 116-2 can receive the time of transmission of the spread spectrum signal over an audio data channel. In some other embodiments, smart speaker 116-2 can receive the time of transmission of the spread spectrum signal over network 114 using a wireless communication protocol.

In 210, smart speaker 116-2 calculates a playback based on the time of receipt and the time of transmission.

In 212, smart speaker 116-2 controls the playback of audiovisual content based on the playback delay. For example, smart speaker 116-2 can delay playback of the audiovisual content to synchronize the playback with smart speaker 116-1. In some embodiments, smart speaker 116-2 can increase the amount of audiovisual content to buffer based on the playback delay. In some other embodiments, smart speaker 116-2 can change the playback offset for playing back audiovisual content.

In some embodiments, a master device such as smart speaker 116-2 can calculate the longest payback delay among all smart speakers 116 in media system 102. The master device can then control the playback of the audiovisual content by adjusting the delay at each smart speaker 116 to be the longest playback delay.

Echo Cancellation Using a Spread Code

In some embodiments, media system 102 can use a spreading code to perform echo cancellation at a smart speaker 116. As discussed above, a smart speaker 116 can enable a user to issue voice commands to a built-in voice activated digital assistant to perform various tasks.

But the issued voice commands may not be processed accurately by the digital assistant. This is because the audio captured at the microphone 118 of the smart speaker 116 may contain echo. Specifically, the audio captured at the microphone 118 may contain an audio sample previously outputted by the smart speaker 116 (or a different speaker)

along with the voice commands from the user. In other words, when the smart speaker 116 releases an audio sample for output, the same audio sample may be captured at the microphone 118 of the smart speaker 116 used to capture voice commands. Moreover, the microphone 118 of the smart speaker 116 may pick up audio outputted by a different speaker (e.g., another smart speaker 116) along with the captured voice commands.

Conventional solutions often cannot remove this echo from the captured audio because they cannot correlate the time delay between an audio sample being output at a speaker and when the same audio sample is captured by a microphone. This often occurs where the audio path delay of the speaker is unknown. For example, this may occur where a smart speaker 116 outputs audio through another component such an amplifier. In this case, the audio path output delay through the smart speaker 116 and the other component may be unknown.

In some embodiments, this technological problem can be solved by using a spreading code to correlate the time delay between output of an audio sample at a speaker and when the same sample is captured by a microphone. In other words, this technological problem can be solved by using a spreading code to determine the echo delay starting from the release of an audio sample from a speaker to the time the audio sample is captured in a microphone.

By way example, and not limitation, a user may want to issue voice commands to smart speaker 116-1. In addition, media device 120 may be configured to playback audiovisual content at smart speaker 116-1. This can cause the audio captured at microphone 118-1 of smart speaker 116-1 to contain an audio sample previously outputted by smart speaker 116-1 along with voice commands from a user. In other words, the audio sample can go out the speaker of smart speaker 116-1 and back into microphone 118-1 of smart speaker 116-1. In essence, smart speaker 116-1 can record over microphone 118-1 what it previously played out the speaker of smart speaker 116-1.

Echo cancellation can be used to remove echo from captured audio of a microphone. To perform echo cancellation, an echo cancellation algorithm may need to know what was played out, what was recorded, and what the delay was between the echo played out and the echo showing up in the microphone recording. For example, in order to remove echo from the captured audio of microphone 118-1 of smart speaker 116-1, smart speaker 116-1 may need to determine the time between releasing an audio sample for output and the time when the same audio sample is received from microphone 118-1.

But conventional solutions often cannot determine an echo delay of a smart speaker 116. This is because the smart speaker 116 can have an unknown audio path delay. As discussed above, this technological problem can be solved by using a spreading code to correlate the time delay between output of an audio sample at a speaker and when the same audio sample is captured by a microphone.

In some embodiments, media system 102 can calculate the echo delay between output of an audio sample at smart speaker 116-2 and when the same audio sample is captured by microphone 118-1 of smart speaker 116-1. However, as would be appreciated by a person of ordinary skill in the art, media system 102 can calculate the echo delay between output of an audio sample at smart speaker 116-1 and when the same audio sample is captured by microphone 118-1 of smart speaker 116-1. As would be appreciated by a person of ordinary skill in the art, media system 102 can capture an echo delay for each smart speaker 116.

In some embodiments, a user may want to capture voice commands at smart speaker 116-1. In addition, the user may want to perform echo cancellation with respect to audio output at smart speaker 116-2. This may require calculating the echo delay of smart speaker 116-2. This echo delay can be calculated by playing a spread spectrum signal through smart 116-2 and correlating the output at smart speaker 116-1 using a spreading code.

Specifically, as discussed above, smart speakers 116 can share a common clock that determines when to output a particular audio sample. But there can still be a playback delay at each smart speaker 116. For example, the playback delay may include an airtime and audio path delay of each smart speaker 116. In order to calculate the echo delay for smart speaker 116-2 so that echo can be removed from microphone 118-1 of smart speaker 116-1, smart speaker 116-2 can generate an audio base signal. The audio base signal can be modulated using Binary Phase-shift Keying (BPSK).

After generating the audio base signal, smart speaker 116-2 can continuously apply a spreading code to the audio base signal. For example, smart speaker 116-2 can apply the spreading code to the audio base signal by multiplying the audio base signal by the spreading code. Smart speaker 116-2 can output the resulting spread spectrum signal to smart speaker 116-1.

As discussed above, the spreading code can be configured to repeat after a period of time (e.g., every second). The spreading code can be pseudorandom sequence of bits. The spreading code can also be orthogonal spreading code.

In some embodiments, smart speakers 116-1 and 116-2 can agree on a common reference point for correlation using the spreading code. For example, if a reference point for applying the spreading code is the zeroth bit for the zeroth sample, then the spreading code will only match the zeroth audio sample at the zeroth bit. Thus, using an orthogonal spreading code, smart speaker 116-2 can accurately identify a time of receipt of a particular audio sample from smart speaker 116-1.

Smart speaker 116-2 can transmit a time of transmission of a particular audio sample to smart speaker 116-1. The time of transmission can be a timestamp of the synchronized clock of smart speaker 116-2 when smart speaker 116-2 sent the particular audio sample to smart speaker 116-1. For example, smart speaker 116-2 can generate a timestamp of when it sent out the zeroth audio sample to smart speaker 116-1. Smart speaker 116-2 can then encode the timestamp and send it to smart speaker 116-1. Smart speaker 116-2 can send the encoded timestamp shortly after transmitting the corresponding audio sample to smart speaker 116-1. In some embodiments, smart speaker 116-2 can send the encoded timestamp using the audio data channel. In other words, smart speaker 116-2 can send the encoded time stamp using a spread spectrum signal. In some other embodiments, smart speaker 116-2 can send the encoded timestamp over network 114. As would be appreciated by a person of ordinary skill in the art, smart speaker 116-2 can send the encoded timestamp to smart speaker 116-1 using various other techniques.

By way of example, where the reference point is the zeroth bit for the zeroth audio sample, smart speaker 116-2 can send out the zeroth audio sample followed by a timestamp of the zeroth audio sample. Smart speaker 116-1 can receive the zeroth audio sample in the spread spectrum signal. Smart speaker 116-1 can then slide the spreading code over the received audio sample to determine if it is the zeroth audio sample. Smart speaker 116-2 can have its own timestamp for receipt of the zeroth audio sample.

Smart speaker 116-1 can determine an echo delay of smart speaker 116-2 by calculating the difference between the received time of transmission of the zeroth audio sample and its own time of receipt of the zeroth audio sample.

In some embodiments, after calculating the echo delay, smart speaker 116-1 can perform echo cancellation based on the echo delay. In particular, because smart speaker 116-1 knows what audio sample was played out, what was recorded, and the echo delay of smart speaker 116-2, smart speaker 116-1 can apply an echo cancellation algorithm to captured audio at its microphone 118-1. This echo cancellation algorithm can remove an audio sample output at smart speaker 116-2 and also captured at microphone 118-1 of smart speaker 116-1. In other words, the echo cancellation algorithm can remove the audio sample from the captured audio at microphone 118-1 so that only the voice commands remain. This can improve voice recognition accuracy. This can further improve the likelihood that a digital assistant will perform the right function in response to the voice commands.

Figure 3:
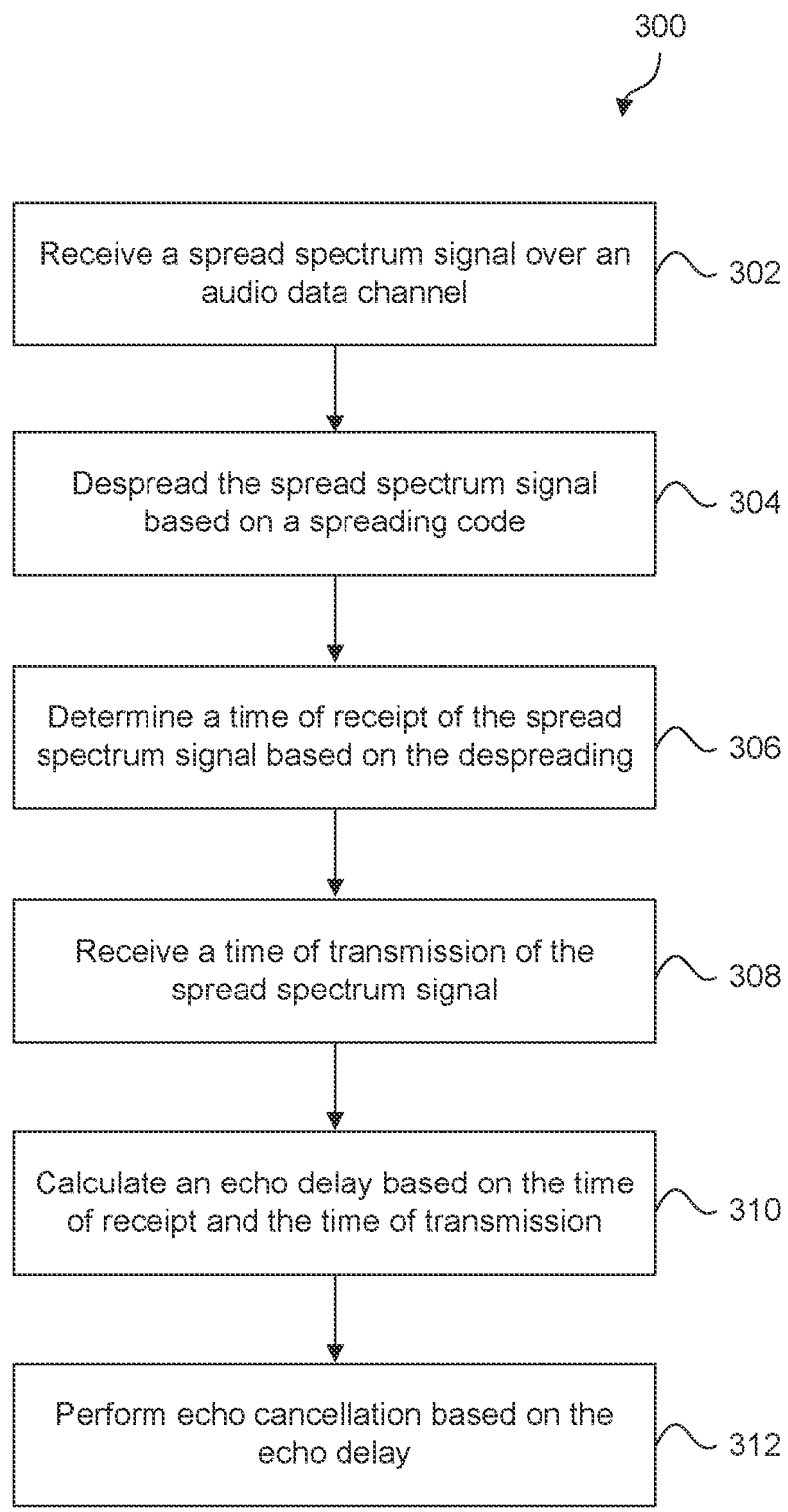
FIG. 3 illustrates a flowchart for using a spreading code to perform echo cancellation at a smart speaker, according to some embodiments.

FIG. 3 illustrates a method 300 for using a spreading code to perform echo cancellation at a smart speaker, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

For illustrative and non-limiting purposes, method 300 shall be described with reference to FIG. 1. However, method 300 is not limited to those examples.

In 302, smart speaker 116-1 receives a spread spectrum signal from smart speaker 116-2. The spread spectrum signal is received over an audio data channel. In some embodiments, smart speaker 116-1 receive the spread spectrum signal at boot up of smart speaker 116-2. In some other embodiments, smart speaker 116-1 receives the spread spectrum signal in response to a user command. In some other embodiments, smart speaker 116-1 receives the spread spectrum signal when system 102 encounters a threshold amount of synchronization errors in network 114.

In 304, smart speaker 116-1 despreads the spread spectrum signal based on a spreading code. The spreading code can be exchanged between smart speaker 116-1 and smart speaker 116-2 in advance of 302. Smart speaker 116-1 can despread the spread spectrum signal based on a reference point associated with the spreading code. For example, smart speaker 116-1 can despread based on sample 0. Smart speaker 116-1 can perform the despread using a sliding window.

In 306, smart speaker 116-1 determines a time of receipt of the spread spectrum signal based on the despreading.

In 308, smart speaker 116-1 receives a time of transmission of the spread spectrum signal from smart speaker 116-2. In some embodiments, smart speaker 116-1 can receive the time of transmission of the spread spectrum signal over an audio data channel. In some other embodiments, smart speaker 116-1 can receive the time of transmission of the spread spectrum signal over network 114 using a wireless communication protocol.

In 310, smart speaker 116-1 calculates an echo delay based on the time of receipt and the time of transmission.

In 312, smart speaker 116-1 can perform echo cancellation based on the echo delay. In particular, because smart speaker 116-1 knows what audio sample was played out, what was recorded, and the echo delay, smart speaker 116-1 can apply an echo cancellation algorithm to captured audio at its microphone 118-1. This echo cancellation algorithm can remove an audio sample output at smart speaker 116-2 and also captured at microphone 118-1 of smart speaker 116-1. In other words, the echo cancellation algorithm can remove the audio sample from the captured audio (at microphone 118-1 so that only the voice commands remain. This can improve voice recognition accuracy. This can further improve the likelihood that a digital assistant will perform the right function in response to the voice commands.

Audio Synchronization of a Dumb Speaker and a Smart Speaker Using a Spread Code

As discussed above, a user often wants to synchronize the playback of audiovisual content across both dumb speakers and smart speakers in their home. But conventional solutions often cannot synchronize the playback of audiovisual content across both dumb and smart speakers in their home. This is because conventional solutions are unable to determine the audiovisual output path delay associated with receipt of the audiovisual content at a dumb speaker and the actual output of the audiovisual content at the dumb speaker.

For example, a user may want to connect a dumb speaker 122 (e.g., a sound bar) to display device 104 to output audio using dumb speaker 122 instead of speaker 108 of display device 104. Display device 104 may have smart speaker functionality. In other words, display device 104, via dumb speaker 122, and smart speakers 116 may use network 114 to simultaneously output the same audio content. In these situations, the user may want to synchronize the playback of the audio content across dumb speaker 122 and smart speakers 116.

But conventional solutions are unable synchronize the playback of audiovisual content across both a dumb spear and smart speakers. This is because conventional solutions are unable to determine the audiovisual output path delay associated with receipt of the audiovisual content at the dumb speaker and the output of the audio content at the dumb speaker. In other words, when a user attaches dumb speaker 122 to display device 104, display device 104 cannot determine how long it will take starting from when it transmits audio data to dumb speaker 122 to when dumb speaker 122 actually outputs the audio. There is an unknown audiovisual output path delay associated with dumb speaker 122. Because display device 104 cannot determine the audiovisual output path delay associated with dumb speaker 122, display device 104 cannot ensure that dumb speaker 122 is synchronized with the playback of smart speakers 116 in media system 102.

But this technological problem can be solved using a spreading code. Specifically, this technological problem can be solved with the playback of an audio tone using a spreading code through the dumb speaker (e.g., dumb speaker 122).

By way of example, and not limitation, display device 104 can be configured to communicate with smart speakers 116 over network 114. In other words, display device 104 and smart speakers 116 may use network 114 to simultaneously play the same audiovisual content. In addition, display device 104 may be connected to dumb speaker 122. For example, display device 104 may be connected to dumb speaker 122 via an HDMI ARC (audio return channel) connection or port. Thus, display device 104 may be configured to simultaneously playback the same audiovisual content at smart speakers 116 and dumb speaker 122.

As discussed above, display device 104 may be connected to dumb speaker 122 via an HDMI ARC connection. HDMI ARC can refer to a feature of the HDMI interface built into many TVs, receivers, sound bars, and speakers, to name just some examples. ARC can use a single HDMI connection to output audio from a first device (e.g., a TV) to a second device such as a sound bar, speakers, or audio/video (AV) receiver. From video that is sent to a TV over the HDMI interface, the same HDMI interface can send the associated audio from the TV back over the HDMI interface. In doing so, the audio of the TV content may be sent to a receiver, sound bar, or speaker for higher quality audio output than may be achieved over the TV's internal speakers. Moreover, no separate audio cable is required. To use HDMI ARC, a TV, display device, receiver, sound bar, or media device, for example, must be HDMI ARC compatible.

When the term "ARC" is used alone in this specification, it should be assumed to be equivalent to the term "HDMI/ARC." When referring to ARC or HDMI ARC, the words "connector," "connection," "interface," or "port" may be used interchangeably within the specification. The terms generally mean a direct or indirect link or an electronic coupling for means of communication or transport. In various embodiments, two or more devices may be integrated with, operatively coupled to, and/or connected to each other over HDMI ARC.

As would be appreciated by a person of ordinary skill in the art, display device 104 can be connected to dumb speaker 122 using various other connection types. For example, display device 104 can be connected to dumb speaker 122 using a Radio Corporation of America (RCA) channel or an optical channel. Regardless of the connection type used, the same issue remains. Specifically, display device 104 is unable to determine the audiovisual output path delay of dumb speaker 122. Because display device 104 cannot determine the audiovisual output path delay, there is no way to ensure the synchronized playback of audiovisual content at dumb speaker 122 and smart speakers 116.

Conventional solutions may solve this problem by testing different dumb speakers in a laboratory to measure their audiovisual output path delays. But this is cumbersome, error prone, and impractical. Moreover, conventional solutions may require a user to specify the particular model of dumb speaker 122 being connected to display device 104.

But this technological problem of how determine the audiovisual output path delay of a dumb speaker, can be solved with the playback of an audio tone using a spreading code through the dumb speaker.

In some embodiments, to determine the audiovisual output path delay of dumb speaker 122, display device 104 can generate an orthogonal spreading code. Moreover, display device 104 can generate an audio base signal. The audio base signal can be a base signal modulated using Binary Phase-shift Keying (BPSK).

After generating the audio base signal, display device 104 can continuously apply the spreading code to the audio base signal before outputting the resulting spread spectrum signal at dumb speaker 122. Display device 104 can apply the spreading code to the audio base signal by multiplying the base signal by the spreading code.

Display device 104 can establish a common spreading code to use to determine the audiovisual output path delay of dumb speaker 122. Display device 104 can establish the particular pseudorandom sequence of bits for the spreading code, the specific length of the spreading code, and repeat frequency for the spreading code. In addition, display device 104 can establish a reference point for correlation using the spreading code.

Display device 104 can output the resulting spread spectrum signal through dumb speaker 122. To determine the audiovisual output path delay from display device 104 to the actual output of audio at dumb speaker 122, display device 104 can capture the outputted spread spectrum signal from dumb speaker 122. Display device 104 can then attempt to correlate against it using the spreading code.

For purposes of discussion, it is assumed that display device 104 captures the outputted spread spectrum signal. However, as would be appreciated by a person of ordinary skill in the art, other components in media system 102 can capture the spread spectrum signal to calculate the audiovisual output path delay through dumb speaker 122. For example, in some embodiments, the received outputted spread spectrum signal may be captured at audio responsive remote control 124.

In some embodiments, the spreading code can be orthogonal. In this case, when display device 104 uses the spreading code to despread the spread spectrum signal, the spreading code can only match at a particular spot. In other words, the spreading code can correlate only at a particular audio sample. This can enable display device 104 to identify exactly when it receives a particular audio sample output from dumb speaker 122.

In some embodiments, display device 104 can identify when it receives a particular audio sample using a sliding window technique. Specifically, display device 104 can select a sliding window into the spreading code based on a reference point. Display device 104 can then move the sliding window over a received audio sample. As would be appreciated by a person of ordinary skill in the art, the sliding window into the spreading code will correlate only at a particular audio sample. For example, if the reference point is the zeroth bit for zeroth audio sample, then the spreading code will only match the zeroth audio sample at the zeroth bit. Thus, using an orthogonal spreading code, display device 104 can accurately identify a time of receipt of a particular audio sample from dumb speaker 122.

To calculate the audiovisual output path delay through dumb speaker 122, the time of receipt of the particular audio sample from dumb speaker 122 can be compared to a time of transmission of the particular audio sample to dumb speaker 122. In some embodiments, display device 104 can transmit the time of transmission of the particular audio sample over HDMI ARC 110 to dumb speaker 122 for output. The time of transmission can be a timestamp of the synchronized clock of display device 104 when display device 104 sent the particular audio sample to dumb speaker 122 over HDMI ARC 110. For example, display device 104 can generate a timestamp of when it sent out the zeroth audio sample to dumb speaker 122 over HDMI ARC 110. Display device 104 can then encode the timestamp and send it to dumb speaker 122 over HDMI ARC 110. Display device 104 can send the encoded timestamp shortly after transmitting the corresponding audio sample to dumb speaker 122 over HDMI ARC 110.

By way of example, where the reference point is the zeroth bit for the zeroth audio sample, display device 104 can send out the zeroth audio sample followed by a timestamp of the zeroth audio sample to dumb speaker 122 over HDMI ARC 110. Display device 104 can receive the zeroth audio sample in the spread spectrum signal output by dumb speaker 122. Display device 104 can then slide the spreading code over the received audio sample to determine if it is the zeroth audio sample. Display device 104 can then determine a time of receipt of the zeroth audio sample.

Display device 104 can determine the audiovisual output path delay of dumb speaker 122 by calculating the difference between the received time of transmission of the zeroth audio sample and its own time of receipt of the zeroth audio sample. As would be appreciated by a person of ordinary skill in the art, media system 102 can calculate the audiovisual output path delay of dumb speaker 122 at any other component in media system 102.

In some embodiments, after calculating the audiovisual output path delay of dumb speaker 122, a "master device" of media system 102 can control the playback of the audiovisual content at smart speakers 116 based on the audiovisual output path delay of dumb speaker 122. As would be appreciated by a person of ordinary skill in the art, the master device can be a smart speaker 116, audio responsive remote control 124, media device 120, display device 104, and/or any other component communicatively coupled to smart speakers 116 over network 114.

In some embodiments, the master device can cause different smart speakers 116 to delay their output so that they are in line with dumb speaker 122. For example, the master device can cause each smart speaker 116 to delay its output for at least the audiovisual output path delay of dumb speaker 122.

The master device can cause each smart speaker 116 to delay its output using various techniques as would appreciated by a person of ordinary skill in the art. In some embodiments, the master device can change an amount of audiovisual content to buffer at a smart speaker 116 based on how much to delay the output. In some other embodiments, the master device can change a playback offset for the audiovisual content at a smart speaker 116 based on how much to delay the output.

In some embodiments, involving playing a spread spectrum signal through a dumb speaker to synchronize the playback of audiovisual content across both the dumb speaker and smart speakers, the playback synchronization process can be performed at boot up of display device 104. In some other embodiments, the playback synchronization process can be performed as needed.

In some other embodiments, a user may want to connect a display device such as display device 104 to a media device 120. In this case, display device 104 may not be connected to smart speakers 116 using network 114. But media device 120 may be configured to communicate with smart speakers 116 using network 114. The user may want to synchronize the playback of audiovisual content from media device 120 at both speaker 108 of display device 104 and smart speakers 116. But conventional solutions cannot synchronize the playback of audiovisual content across both speaker 108 of display device 104 and smart speakers 116. This is because conventional solutions are unable to determine the audiovisual output path delay associated with receipt of the audiovisual content at display device 104 and the actual output of the audio content at speaker 108 of display device 104.

Similar to above, this technological problem can be solved using a spreading code. Specifically, this technological problem can be solved with the playback of an audio tone using a spreading code from media device 120 through display device 104. Media device 120 may be connected to display device 104 using a HDMI cable. However, as would be appreciated by a person of ordinary skill in the art, media device 120 can be connected display device 140 using various other connection types.

In some embodiments, to determine the audiovisual output path delay of display device 104, media device 120 can generate an orthogonal spreading code. Moreover, media device 120 can generate an audio base signal. The audio base signal can be a base signal modulated using Binary Phase-shift Keying (BPSK).

After generating the audio base signal, media device 120 can continuously apply the spreading code to the audio base signal before outputting the resulting spread spectrum signal at speaker 108 of display device 104. Media device 120 can apply the spreading code to the audio base signal by multiplying the base signal by the spreading code.

Media device 120 can establish a common spreading code to use to determine the audiovisual output path delay of display device 104. Media device 120 can establish the particular pseudorandom sequence of bits for the spreading code, the specific length of the spreading code, and repeat frequency for the spreading code. In addition, media device 120 can establish a reference point for correlation using the spreading code.

Media device 120 can output the resulting spread spectrum signal through display device 104. To determine the audiovisual output path delay from media device 120 to the actual output of audio at speaker 108 of display device 104, media device 120 can capture the outputted spread spectrum signal from speaker 108 of display device 104. Media device 120 can then attempt to correlate against it using the spreading code.

For purposes of discussion, it is assumed that media device 120 captures the outputted spread spectrum signal. However, as would be appreciated by a person of ordinary skill in the art, other components in media system 102 can capture the spread spectrum signal to calculate the audiovisual output path delay through display device 104. For example, in some embodiments, the received outputted spread spectrum signal may be captured at audio responsive remote control 124.

In some embodiments, the spreading code can be orthogonal. In this case, when media device 120 uses the spreading code to despread the spread spectrum signal, the spreading code can only match at a particular spot. In other words, the spreading code can correlate only at a particular audio sample. This can enable media device 120 to identify exactly when it receives a particular audio sample output from speaker 108 of display device 104.

In some embodiments, media device 120 can identify when it receives a particular audio sample using a sliding window technique. Specifically, media device 120 can select a sliding window into the spreading code based on a reference point. Media device 120 can then move the sliding window over a received audio sample. As would be appreciated by a person of ordinary skill in the art, the sliding window into the spreading code will correlate only at a particular audio sample. For example, if the reference point is the zeroth bit for zeroth audio sample, then the spreading code will only match the zeroth audio sample at the zeroth bit. Thus, using an orthogonal spreading code, media device 120 can accurately identify a time of receipt of a particular audio sample from speaker 108 of display device 104.

To calculate the audiovisual output path delay through display device 104, the time of receipt of the particular audio sample from speaker 108 of display device 104 can be compared to a time of transmission of the particular audio sample to display device 104. In some embodiments, media device 120 can transmit the time of transmission of the particular audio sample over HDMI connection to display device 104 for output at speaker 108. The time of transmission can be a timestamp of the synchronized clock of media device 120 when media device 120 sent the particular audio sample to display device 104 over the HDMI connection. For example, media device can generate a timestamp of when it sent out the zeroth audio sample to display device 104 over the HDMI connection. Media device 120 can then encode the timestamp and send it to display device 104 over the HDMI connection. Media device 120 can send the encoded timestamp shortly after transmitting the corresponding audio sample to display device 104 over the HDMI connection.

By way of example, where the reference point is the zeroth bit for the zeroth audio sample, media device 120 can send out the zeroth audio sample followed by a timestamp of the zeroth audio sample to display device 104 over the HDMI connection. Media device 120 can receive the zeroth audio sample in the spread spectrum signal output by speaker 108 of display device 104. Media device 120 can then slide the spreading code over the received audio sample to determine if it is the zeroth audio sample. Media device 120 can then determine a time of receipt of the zeroth audio sample.

Media device 120 can determine the audiovisual output path delay of display device 104 by calculating the difference between the received time of transmission of the zeroth audio sample and its own time of receipt of the zeroth audio sample. As would be appreciated by a person of ordinary skill in the art, media system 102 can calculate the audiovisual output path delay of display device 104 at any other component in media system 102.

In some embodiments, after calculating the audiovisual output path delay of display device 104, a "master device" of media system 102 can control the playback of the audiovisual content at smart speakers 116 based on the audiovisual output path delay of display device 104. As would be appreciated by a person of ordinary skill in the art, the master device can be a smart speaker 116, audio responsive remote control 124, media device 120, and/or any other component communicatively coupled to smart speakers 116 over network 114.

In some embodiments, the master device can cause different smart speakers 116 to delay their output so that they are in line with display device 104. For example, the master device can cause each smart speaker 116 to delay its output for at least the audiovisual output path delay of display device 104.

The master device can cause each smart speaker 116 to delay its output using various techniques as would appreciated by a person of ordinary skill in the art. In some embodiments, the master device can change an amount of audiovisual content to buffer at a smart speaker 116 based on how much to delay the output. In some other embodiments, the master device can change a playback offset for the audiovisual content at a smart speaker 116 based on how much to delay the output.

In some embodiments, involving playing a spread spectrum signal through a display device to synchronize the playback of audiovisual content across both the display device and smart speakers, the playback synchronization process can be performed at boot up of a media device 120 connected to the display device. In some other embodiments, the playback synchronization process can be performed as needed.

Figure 4:
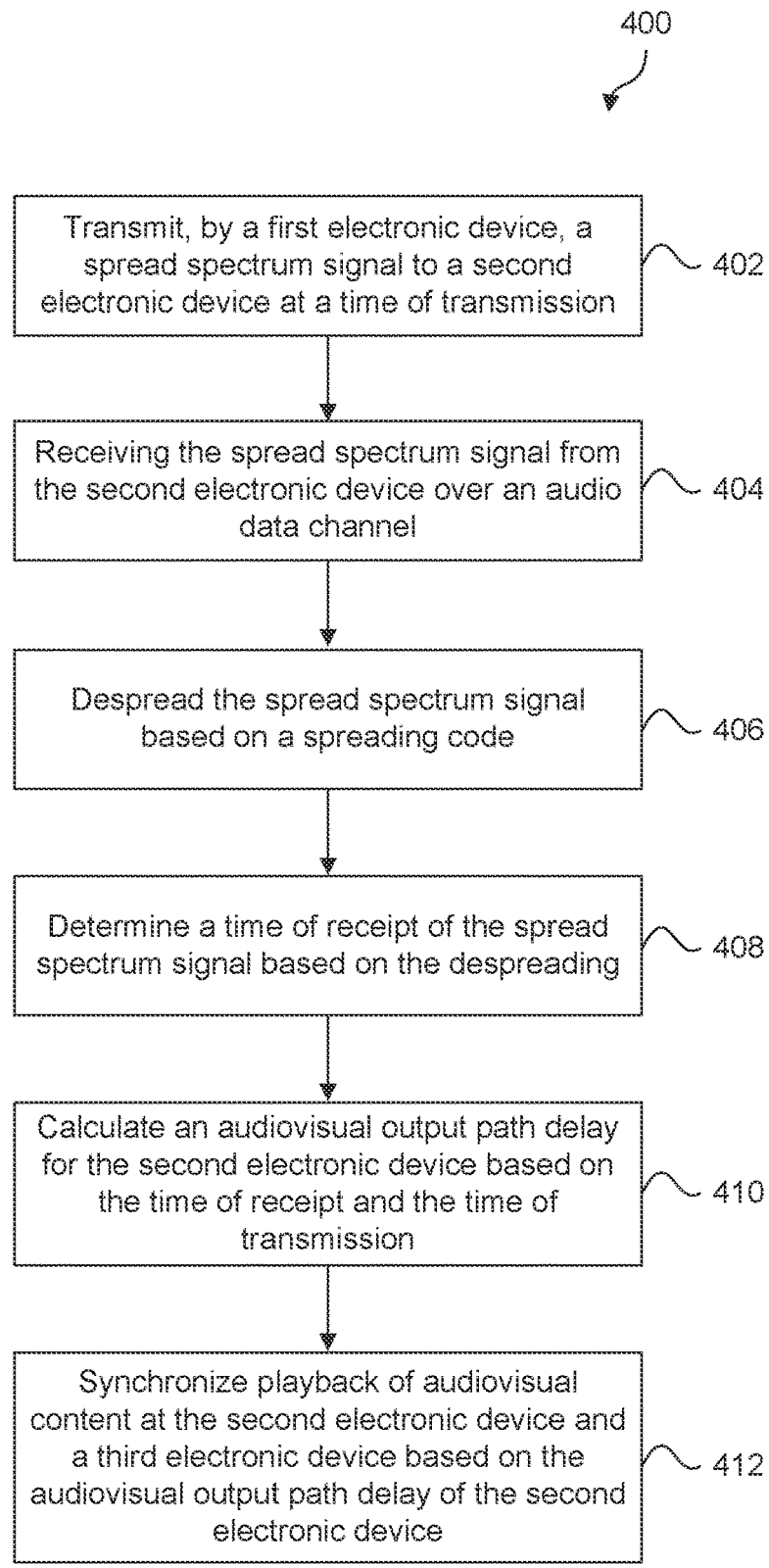
FIG. 4 illustrates a flowchart for synchronizing playback of audiovisual content across both dumb speakers and smart speakers, according to some embodiments.

FIG. 4 illustrates a method 400 for synchronizing the playback of audiovisual content across both dumb speakers and smart speakers, according to some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

For illustrative and non-limiting purposes, method 400 shall be described with reference to FIG. 1. However, method 400 is not limited to those examples.

In 402, a first electronic device (e.g., display device 104) transmits a spread spectrum signal to a second electronic device (e.g., dumb speaker 122) at a time of transmission.

In 404, the first electronic device receives the spread spectrum signal from the second electronic device over an audio data channel.

In 406, the first electronic device despreads the spread spectrum signal based on a spreading code. The first electronic device can despread the spread spectrum signal based on a reference point associated with the spreading code. For example, the first electronic device can despread based on sample 0. The first electronic device can perform the despread using a sliding window.

In 408, the first electronic device determines a time of receipt of the spread spectrum signal based on the despreading.

In 410, the first electronic device calculate an audiovisual output path delay for the second electronic device based on the time of receipt and the time of transmission.

In 412, a master device such as, but not limited to the first electronic device, synchronizes the playback of audiovisual content at the second electronic device (e.g., dumb speaker 122) and a third electronic device (e.g., smart speaker 116-1 or smart speaker 116-2) based on the audiovisual output path delay of the second electronic device.

In some embodiments, the master device can cause different smart speakers 116 to delay their output so that they are in line with dumb speaker 122. For example, the master device can cause each smart speaker 116 to delay its output for at least the audiovisual output path delay of dumb speaker 122.

The master device can cause each smart speaker 116 to delay its output using various techniques as would appreciated by a person of ordinary skill in the art. In some embodiments, the master device can change an amount of audiovisual content to buffer at a smart speaker 116 based on how much to delay the output. In some other embodiments, the master device can change a playback offset for the audiovisual content at a smart speaker 116 based on how much to delay the output.

Adjusting Playback of Audiovisual Content at a Location in a Room

As discussed above, a user often wants to optimize their listening experience when using multiple speakers. For example, a user may want sound outputted from each speaker to reach their ears at the same to create an optimal surround sound experience. Similarly, a user may want to simulate a surround sound experience using a stereo speaker setup. In either case, it is often necessary to know the time it takes for sound from each speaker to reach where the user is positioned. Once these airtime delays are known, different outputs delays can be added to the speakers to create an ideal listening experience.

But conventional solutions are unable to automatically create a particular listening experience for a particular spot in a room. Specifically, conventional solutions are unable to automatically determine the time it takes for sound from each speaker to reach where a user is positioned, let alone set the appropriate delays at each speaker to create the particular listening experience for where the user is positioned. Instead, conventional solutions typically require users to physically measure distances between different speakers and their preferred listening spot. The user then has to enter these measurements into a system that adjusts the playback delay of each speaker. This process is tedious and error prone, especially when the user wants to change their listening experience (e.g., change the number of speakers or change their sitting position).

In some embodiments, this technological problem can be solved by using a spreading code to calculate the airtime delay between different speakers and a particular location in a room. The technological solution to this technological problem is discussed with respect to FIG. 1 and FIG. 5.

Figure 5:
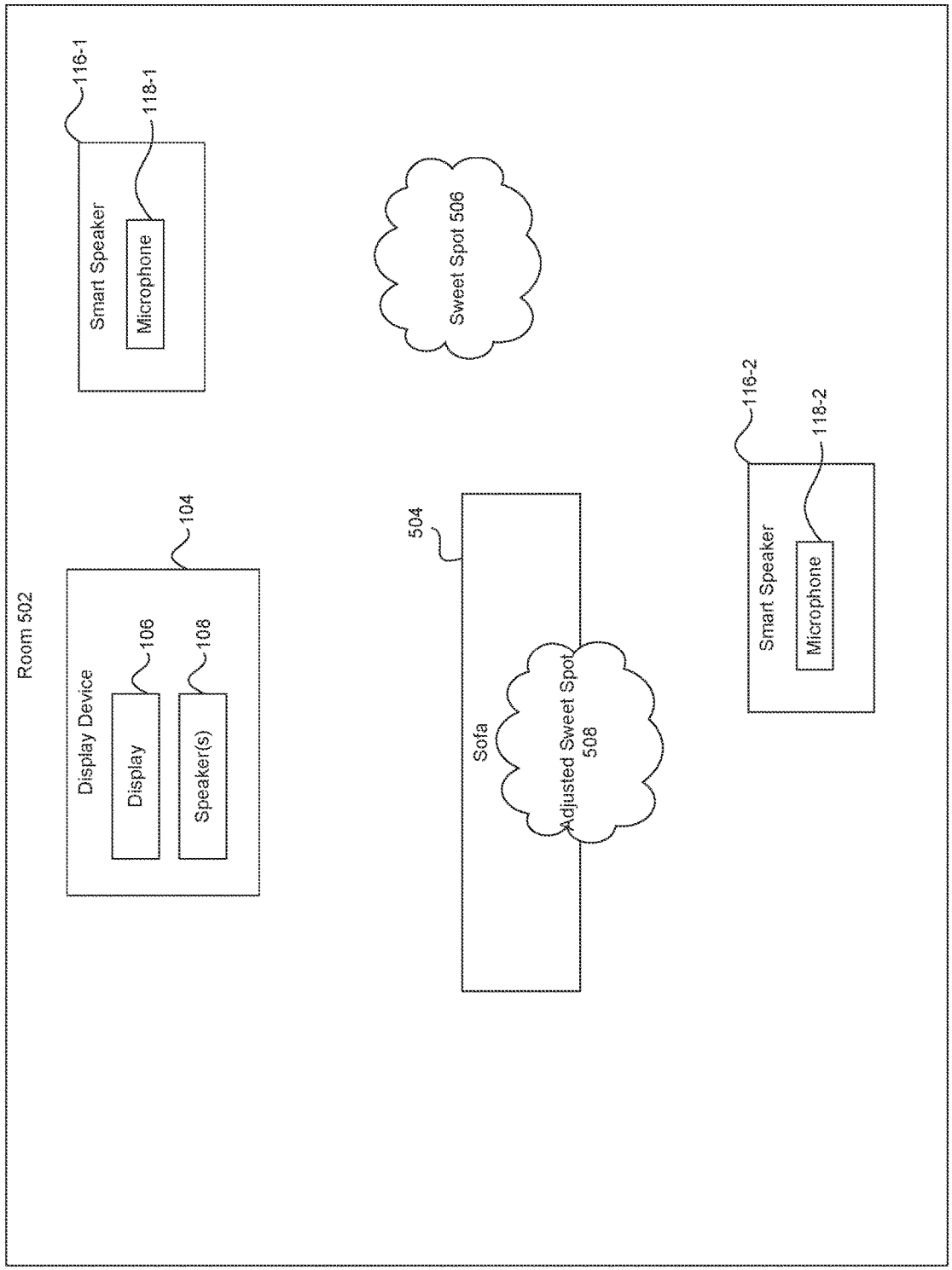
FIG. 5 illustrates a block diagram of an example media system that improves playback of audiovisual content for a particular spot in a room, according to some embodiments.

FIG. 5 illustrates an example media system that optimizes playback of audiovisual content for a particular spot in a room, according to some embodiments. In FIG. 5, the example media system can be media system 102 of FIG. 1. In FIG. 5, the example media system can be placed in room 502. Room 502 can represent a room in which a user would like to create a particular listening experience for a particular spot in a room. This particular spot can be referred to as a sweet spot.

A sweet spot can represent an ideal listening for a particular spot in a room using multiple speakers. For example, the sweet spot can represent a focal point between two stereo speakers where a user is fully capable of hearing the stereo audio mix the way it was intended to be heard by the mixer. Similarly, in the case of surround sound, the sweet spot can represent the focal point between four or more speakers, e.g., the location at which all sound wave fronts arrive simultaneously.

To make a particular spot in a room a sweet spot, the airtime delays from the different speakers to the particular spot must be calculated. But conventional solutions cannot determine these airtime delays. This technological problem can be solved by using a spreading code to correlate the time delay between output of an audio sample at a speaker and when the same sample is captured by a microphone of a different speaker. The calculated airtime delays can then be used to adjust the playback delays at each speaker to create a particular listening experience at the particular spot.

In some embodiments, media system 102 of FIG. 1 can capture an airtime delay between a speaker and a user chosen sweet spot (e.g., adjusted sweet spot 508). Media system 102 can then adjust the playback delay at the speaker so that the sound waves outputted by other speakers arrive at the adjusted sweet spot 508 at the appropriate time to create a particular listening experience.

Media system 102 in room 502 of FIG. 5 includes a display device 104, a smart speaker 116-1, and a smart speaker 116-2. Room 502 also includes a sofa 504 representing a particular spot where a user is interested in listening to a sound experience.

In some embodiments, a user may want to optimize the sound experience from the smart speakers 116-1 and 116-2 for a user at sofa 504. This spot is represented as adjusted sweet spot 508. Adjusted sweet spot 508 can represent a particular listening experience in room 502 after media system 102 has adjusted the playback delays at smart speakers 116-1 and 116-2. For example, media system 102 may adjust the playback delays at smart speakers 116-1 and 116-2 so that the outputted sound waves reach a user's ears at adjusted sweet spot 508 at the same time. Similarly, media system 102 can adjust the playback delays at smart speakers 116-1 and 116-2 so that the outputted sound waves reach the user's ears at different times and create a particular listening experience (e.g., a virtual surround sound experience).

A user may also want to calculate an ideal sweet spot for room 502 prior to any adjustment of the playback delays at smart speakers 116-1 and 116-2. This may be represented as sweet spot 506. As would appreciated by a person of ordinary skill in the art, sweet spot 506 may not be the best practical listening spot for a user. Sweet spot 506 may merely represent an ideal listening spot in room 502 independent of other factors such as seating location (e.g., sofa 504).

To calculate adjusted sweet spot 508, media system 102 can calculate the initial airtime delays to the location represented by adjusted sweet spot 508. This can be solved with the playback of an audio tone using a spreading code.

By way of example, and not limitation, media system 102 can calculate the airtime delay from smart speaker 116-1 to adjusted sweet spot 508. However, a person of ordinary skill in the art would understand that similar techniques could be used to calculate the airtime delay from other speakers (e.g., smart speaker 116-2 or dumb speaker 122) to adjusted sweet spot location 508. Moreover, a person of ordinary skill in the art would understand that multiple airtime delays may need to be calculated. This is because media system 102 may need to adjust the playback delays at different speakers to create the particular listening experience at adjusted sweet spot 508.

To calculate the airtime delay from smart speaker 116-1 to adjusted sweet spot 508, a user can place audio responsive remote control 124 at adjusted sweet spot 508. However, as would be appreciated by a person of ordinary skill in the art, the user can also use a mobile phone, or any other device capable of capturing spread spectrum signal from smart speaker 116-1 and maintaining a shared clock with smart speaker 116-1, at adjusted sweet spot 508.

To calculate the airtime delay from smart speaker 116-1 to adjusted sweet spot 508, smart speaker 116-1 can generate an audio base signal. The audio base signal can be a base signal modulated using Binary Phase-shift Keying (BPSK).

After generating the audio base signal, smart speaker 116-1 can continuously apply a spreading code to the audio base signal before outputting the resulting spread spectrum signal to audio responsive remote control 124. Smart speaker 116-1 can apply the spreading code to the audio base signal by multiplying the audio base signal by the spreading code. Smart speaker 116-1 can output the resulting spread spectrum signal to audio responsive remote control 124.

As discussed above, the spreading code can be configured to repeat after a period of time (e.g., every second). The spreading code can be pseudorandom sequence of bits. The spreading code can also be orthogonal spreading code.

In some embodiments, smart speaker 116-1 and audio responsive remote control 124 can agree on a common reference point for correlation using the spreading code. For example, if a reference point for applying the spreading code is the zeroth bit for the zeroth sample, then the spreading code will only match the zeroth audio sample at the zeroth bit. Thus, using an orthogonal spreading code, audio responsive remote control 124 can accurately identify a time of receipt of a particular audio sample from smart speaker 116-1.

Smart speaker 116-1 can transmit a time of transmission of a particular audio sample to audio responsive remote control 124. The time of transmission can be a timestamp of the synchronized clock of smart speaker 116-1 when smart speaker 116-1 sent the particular audio sample to audio responsive remote control 124. For example, smart speaker 116-1 can generate a timestamp of when it sent out the zeroth audio sample to audio responsive remote control 124. Smart speaker 116-1 can then encode the timestamp and send it to audio responsive remote control 124. Smart speaker 116-1 can send the encoded timestamp shortly after transmitting the corresponding audio sample to audio responsive remote control 124. In some embodiments, smart speaker 116-1 can send the encoded timestamp using the audio data channel. In other words, smart speaker 116-1 can send the encoded time stamp using a spread spectrum signal. In some other embodiments, smart speaker 116-1 can send the encoded timestamp over network 114. As would be appreciated by a person of ordinary skill in the art, smart speaker 116-1 can send the encoded timestamp to audio responsive remote control 124 using various other techniques.

By way of example, where the reference point is the zeroth bit for the zeroth audio sample, smart speaker 116-1 can send out the zeroth audio sample followed by a timestamp of the zeroth audio sample. Audio responsive remote control 124 can receive the zeroth audio sample in the spread spectrum signal. Audio responsive remote control 124 can then slide the spreading code over the received audio sample to determine if it is the zeroth audio sample. Audio responsive remote control 124 can have its own timestamp for receipt of the zeroth audio sample.

Audio responsive remote control 124 can determine an airtime delay of smart speaker 116-1 by calculating the difference between the received time of transmission of the zeroth audio sample and its own time of receipt of the zeroth audio sample. As would be appreciated by a person of ordinary skill in the art, media system 102 can calculate the airtime delay of smart speaker 116-1 at any other component in media system 102.

In some embodiments, after calculating the airtime delay of smart speaker 116-1, a "master device" of media system 102 can control the playback of the audiovisual content at smart speakers 116 and/or any other components of media system 102 to create a particular listening experience at adjusted sweet spot 508 based on the airtime delay of smart speaker 116-1. As would be appreciated by a person of ordinary skill in the art, the master device can be a smart speaker 116, audio responsive remote control 124, media device 120, display device 104, and/or any other component communicatively coupled to smart speakers 116 over network 114.

In some embodiments, media system 102 can calculate the airtime delays from all speakers in media system 102 (e.g., smart speakers 116 and dumb speaker 122). After calculating the airtime delays, media system 102 can adjust the playback delays at the speakers in order to satisfy a particular listening experience (e.g., surround sound at adjust sweet spot 508).

In some embodiments, the master device can cause each smart speaker 116 and/or dumb speaker 122 to delay their output to create a particular listening experience at adjusted sweet spot 508. For example, the master device can cause each smart speaker 116 and/or dumb speaker 122 to delay their output to create a surround sound experience at adjusted sweet spot 508. Similarly, where there are only two speakers (e.g., smart speaker 116-1 and smart speaker 116-2) in media system 102, the master device can cause smart speaker 116-1 and smart speaker 116-2 to delay their output to create a virtual surround sound experience at adjusted sweet spot 508.

The master device can cause each smart speaker 116 to delay its output using various techniques as would be appreciated by a person of ordinary skill in the art. In some embodiments, the master device can change an amount of audiovisual content to buffer at a smart speaker 116 based on how much to delay the output. In some other embodiments, the master device can change a playback offset for the audiovisual content at a smart speaker 116 based on how much to delay the output.

In some other embodiments, a user may want to calculate sweet spot 506 in room 502. Sweet spot 506 can represent an ideal listening spot in room 502 independent of changing in playback delays at the speakers of media system 102.

By way of example, and not limitation, media system 102 can calculate sweet spot 506 using multiple smart speakers 116. This involves calculating a particular location in room 502. As would be appreciated by a person of ordinary skill in the art, this can involve calculating distances between the multiple smart speakers 116. Once the distances are calculated, media system 102 can calculate sweet spot 506 using various algorithms as would be appreciated by a person of ordinary skill in the art.

For example, to calculate the distance between smart speaker 116-1 and smart speaker 116-2, smart speaker 116-1 can generate an audio base signal. The audio base signal can be a base signal modulated using Binary Phase-shift Keying (BPSK).

After generating the audio base signal, smart speaker 116-1 can continuously apply a spreading code to the audio base signal before outputting the resulting spread spectrum signal to smart speaker 116-2.

As discussed above, the spreading code can be configured to repeat after a period of time (e.g., every second). The spreading code can be pseudorandom sequence of bits. The spreading code can also be orthogonal spreading code.

In some embodiments, smart speaker 116-1 and smart speaker 116-2 can agree on a common reference point for correlation using the spreading code. For example, if a reference point for applying the spreading code is the zeroth bit for the zeroth sample, then the spreading code will only match the zeroth audio sample at the zeroth bit. Thus, using an orthogonal spreading code, smart speaker 116-2 can accurately identify a time of receipt of a particular audio sample from smart speaker 116-1.

Smart speaker 116-1 can transmit a time of transmission of a particular audio sample to smart speaker 116-2. The time of transmission can be a timestamp of the synchronized clock of smart speaker 116-1 when smart speaker 116-1 sent the particular audio sample to smart speaker 116-2. For example, smart speaker 116-1 can generate a timestamp of when it sent out the zeroth audio sample to smart speaker 116-2. Smart speaker 116-1 can then encode the timestamp and send it to smart speaker 116-2. Smart speaker 116-1 can send the encoded timestamp shortly after transmitting the corresponding audio sample to smart speaker 116-2. In some embodiments, smart speaker 116-1 can send the encoded timestamp using the audio data channel. In other words, smart speaker 116-1 can send the encoded time stamp using a spread spectrum signal. In some other embodiments, smart speaker 116-1 can send the encoded timestamp over network 114. As would be appreciated by a person of ordinary skill in the art, smart speaker 116-1 can send the encoded timestamp to smart speaker 116-2 using various other techniques.

By way of example, where the reference point is the zeroth bit for the zeroth audio sample, smart speaker 116-1 can send out the zeroth audio sample followed by a timestamp of the zeroth audio sample. Smart speaker 116-2 can receive the zeroth audio sample in the spread spectrum signal. Smart speaker 116-2 can then slide the spreading code over the received audio sample to determine if it is the zeroth audio sample. Smart speaker 116-2 can have its own timestamp for receipt of the zeroth audio sample.

Smart speaker 116-2 can determine an airtime delay of smart speaker 116-1 by calculating the difference between the received time of transmission of the zeroth audio sample and its own time of receipt of the zeroth audio sample. As would be appreciated by a person of ordinary skill in the art, media system 102 can calculate the airtime delay of smart speaker 116-1 at any other component in media system 102.

In some embodiments, after calculating the airtime delay, media system 102 can calculate the distance between smart speaker 116-1 and smart speaker 116-2. Specifically, as would be appreciated by a person of ordinary skill in the art, the speed of sound is 340 meters per second. Media system 102 can calculate the distance between smart speaker 116-1 and smart speaker 116-2 by multiplying the airtime delay by the speed of sound. As would be appreciated by a person of ordinary skill in the art, the accuracy of the distance calculation can be depend on the microphone sampling rate. For example, with a 48 kHz sampling rate, the distance can be calculated down to approximately 7 mm.

In some embodiments, after calculating the airtime delay, media system 102 can calculate the distance and direction between smart speaker 116-1 and smart speaker 116-2. Media system 102 can calculate the distance between smart speaker 116-1 and smart speaker 116-2 by multiplying the airtime delay by the speed of sound. Moreover, media system 102 can calculate the direction between smart speaker 116-1 and smart speaker 116-2 using beam forming techniques as would be appreciated by a person of ordinary skill in the art.

In some embodiments, after media system 102 calculates the distances and/or directions between the multiple smart speakers 116, media system 102 can calculate sweet spot 506 using the distances and/or direction and various algorithms as would be appreciated by a person of ordinary skill in the art.

Figure 6:
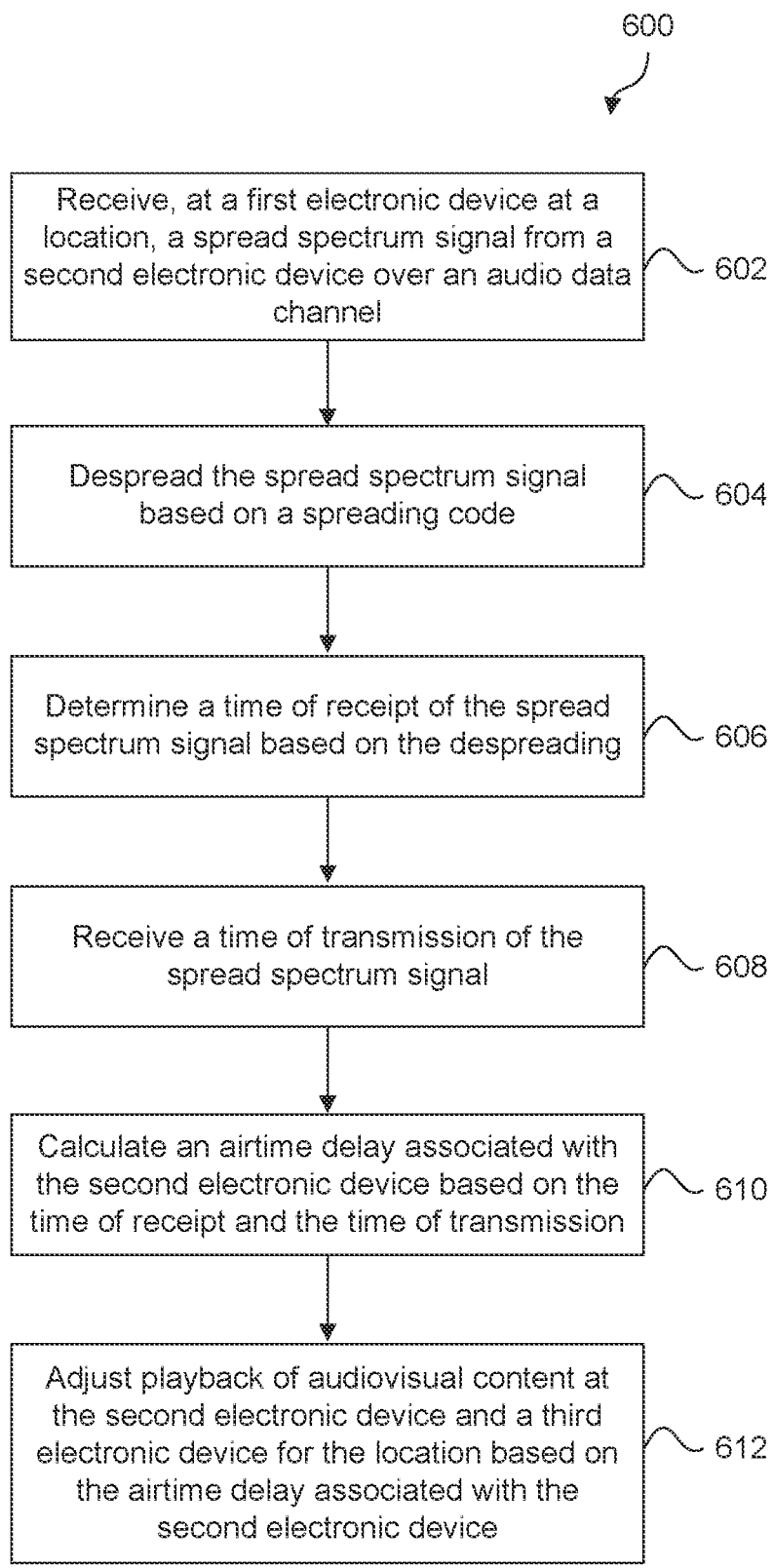
FIG. 6 illustrates a flowchart for improving playback of audiovisual content for a particular spot in a room, according to some embodiments.

FIG. 6 illustrates a method 600 for optimizing playback for a particular spot in a room, according to some embodiments. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art.

For illustrative and non-limiting purposes, method 600 shall be described with reference to FIGS. 1 and 5. However, method 600 is not limited to those examples.

In 602, a first electronic device at a location (e.g., audio responsive remote control 124 at sofa 504), receives a spread spectrum signal from a second electronic device (e.g., smart speaker 116-1). The spread spectrum signal is received over an audio data channel. In some embodiments, the first electronic device receives the spread spectrum signal at boot up of the second electronic device. In some other embodiments, the first electronic device receives the spread spectrum signal in response to a user command. In some other embodiments, the first electronic device receives the spread spectrum signal when media system 102 encounters a threshold amount of synchronization errors in network 114.

In 604, the first electronic device despreads the spread spectrum signal based on a spreading code. The spreading code can be exchanged between the first electronic device and the second electronic device in advance of 602. The first electronic device despreads the spread spectrum signal based on a reference point associated with the spreading code. For example, the first electronic device can despread based on sample 0. The first electronic device can perform the despread using a sliding window.

In 606, the first electronic device determines a time of receipt of the spread spectrum signal based on the despreading.

In 608, the first electronic device receives a time of transmission of the spread spectrum signal from the second electronic device. In some embodiments, the first electronic device can receive the time of transmission of the spread spectrum signal over an audio data channel. In some other embodiments, the first electronic device can receive the time of transmission of the spread spectrum signal over network 114 using a wireless communication protocol.

In 610, the first electronic device calculates an airtime delay associated with the second electronic device based on the time of receipt and the time of transmission.

In 612, a master device such as, but not limited to, the first electronic device adjusts the playback of audiovisual content at the second electronic device and a third electronic device (e.g., smart speaker 116-2) based on the airtime delay associated with the second electronic device.

Automatically Detecting a Change in Speaker Configuration in a Room

As discussed above, a user may want to optimize a listening experience for a particular room in their home. For example, a user may have speakers in their living room, kitchen, and bedroom. When the user is in the living room, they may not want audio content to be played back at the speakers in the kitchen and bedroom. But this situation may occur when the user moves a portable smart speaker from one room to another. For example, the user may normally have a portable smart speaker in the living room. But when the user moves the portable smart speaker to the bedroom, the user may not want audio content to be played back at the portable smart speaker in the bedroom when listening to the audio content in the living room. But conventional solutions are unable to automatically identify what speakers are present in a room, let alone adjust the listening experience based on what speakers are present in the room.

In some embodiments, this technological problem can be solved by using a spreading code to determine distances to different speakers in a room from a fixed location (e.g., from audio responsive remote control 124). The distances to the speakers can be periodically rechecked. When a distance to a speaker changes, the system (e.g., media system 102) can determine that the speaker was moved to a new room. The system can then readjust the listening experience for the room based on the speaker movement. The technological solution to this technological problem is discussed with respect to FIGS. 1, 7A, and 7B.

Figure 7A:
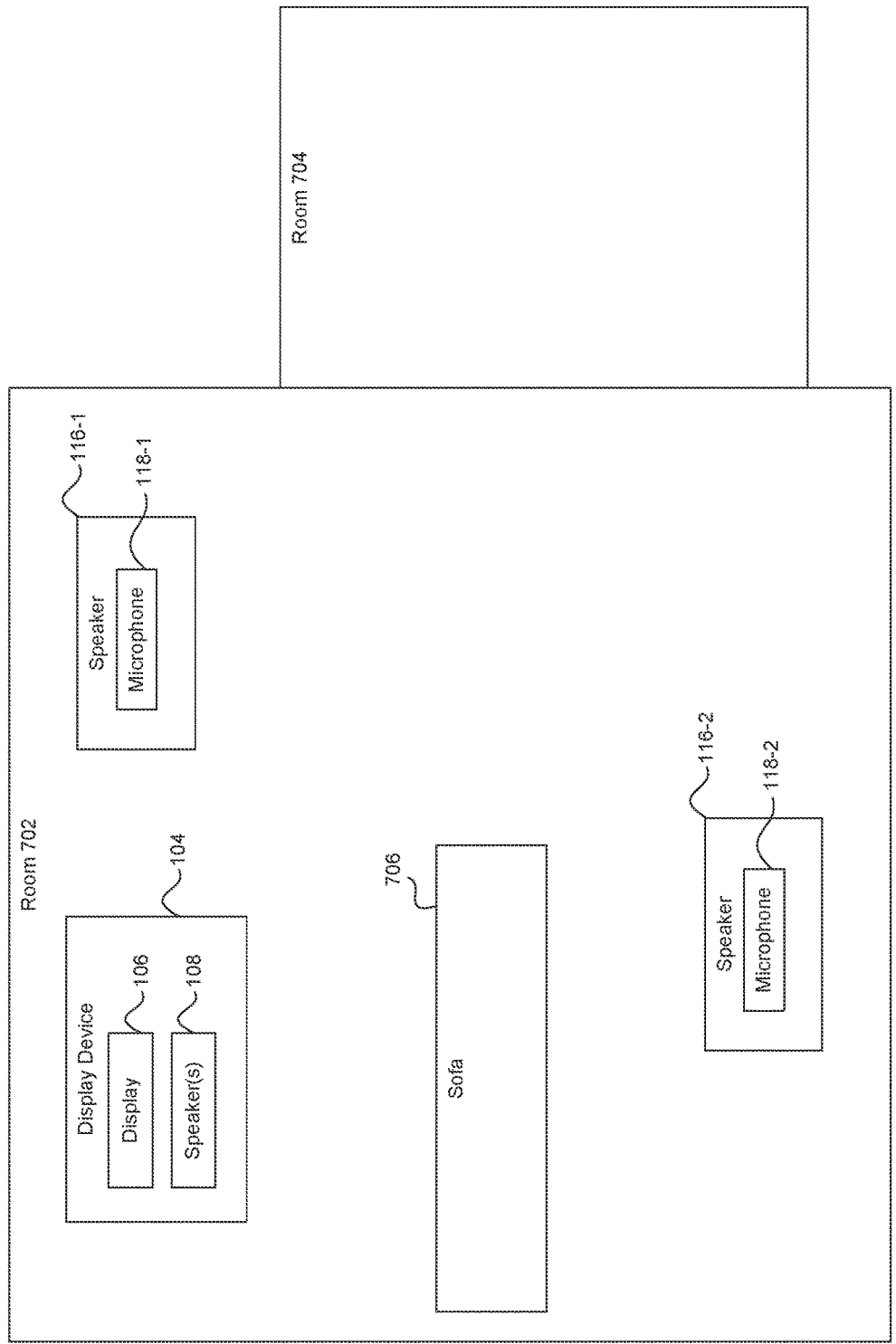
FIG. 7A illustrates a block diagram of an example media system capable of automatically detecting a change in speaker configuration in a room, according to some embodiments.

FIG. 7A illustrates an example media system capable of automatically detecting a change in speaker configuration in a room, according to some embodiments. In FIG. 7A, the example media system can include media system 102 from FIG. 1. In FIG. 7A, the example media system can be configured for us in rooms 702 and 704.

As discussed above in FIG. 1, media system 102 includes display device 104, a smart speaker 116-1, a smart speaker 116-2 in room 702. Room 702 includes a sofa 706. As discussed above, in some embodiments, media system 102 can determine when one of smart speakers 116-1 and 116-2 leaves room 702. In response, media system 102 can readjust a playback experience for a user in room 702.

By way of example, media system 102 may configure smart speakers 116-1 and 116-2 to simultaneously play back audio to a user in room 702. But if one of smart speakers 116-1 or 116-2 is moved to another room (e.g., room 704), the user may not want the audio to be played back in that room as well. Moreover, media system 102 may have configured smart speakers 116-1 and 116-2 to provide a particular listening experience in room 702. For example, media system 102 may have configured smart speakers 116-1 and 116-2 to provide an optimized surround sound experience in room 702. But if one of smart speakers 116-1 or 116-2 is moved to room 704, media system 102 may not be able to provide the particular listening experience anymore. For example, media system 102 may need to change the playback delays of one of smart speakers 116-1 or 116-2 to provide an optimal surround sound experience, or resynchronize the playback of one of smart speakers 116-1 or 116-2 as discussed above. Thus, a user would like media system 102 to automatically determine when one of smart speakers 116-1 or 116-2 is moved to another room, and to readjust the listening experience automatically in response.

In some embodiments, to determine what speakers (e.g., smart speakers 116) are present in room 702, media system 102 can determine distances to the speakers. Media system 102 can then readjust playback at the speakers in response to detecting a change in distance to one of the speakers. To calculate the distances to the speakers, media system 102 can playback an audio tone using a spreading code.

Media system 102 can use a relatively fixed location in order to measure the distances to speakers 116-1 and 116-2 in room 702. This is because if media system 102 calculates the distances between the speakers themselves, a change in distance may not indicate a speaker was moved to a new room (e.g., room 704). Rather, the change can represent a relative change in spacing between the speakers in room 702. Moreover, if media system 102 calculates the distances between the speakers themselves, there is no way to know what speakers changed position. As would be appreciated by a person of ordinary skill in the art, a relatively fixed location provides a common baseline in which to judge a change of distance over time.

In FIG. 7A, media system 102 can use various devices that have a microphone (e.g., audio responsive remote control 124) to represent the fixed location, and from which to calculate the distance to different speakers. As would be appreciated by a person of ordinary skill in the art, a device that stays consistently in the same location in room 702 can be used to represent the fixed location. For example, display device 104 may stay in a relatively fixed location. Moreover, audio responsive remote control 124 may stay in the same location (e.g., at sofa 706). For purposes of discussion, and not limitation, it is assumed that the fixed location is represented by sofa 706, and that the device from which to measure from this location to different speaker in room 702 is audio responsive remote control 124.

In order to determine if a speaker was moved to another room, media system 102 can first determine the initial distances to different speakers in room 702. For purposes of discussion, and not limitation, it is assumed that the initial distance being calculated is from sofa 706 to smart speaker 116-2. As discussed above, audio responsive remote control 124 can be used to calculate the distance to smart speaker 116-2. This is because a user can position audio responsive remote control 124 at sofa 706. Moreover, it may be natural for audio responsive remote control 124 to be placed at or near sofa 706.

To calculate the initial distance, smart speaker 116-2 can generate an audio base signal. The audio base signal can be a base signal modulated using Binary Phase-shift Keying (BPSK).

After generating the audio base signal, smart speaker 116-2 can continuously apply a spreading code to the audio base signal before outputting the resulting spread spectrum signal to audio responsive remote control 124. Smart speaker 116-2 can apply the spreading code to the audio base signal by multiplying the audio base signal by the spreading code. Smart speaker 116-2 can output the resulting spread spectrum signal to audio responsive remote control 124.

As discussed above, the spreading code can be configured to repeat after a period of time (e.g., every second). The spreading code can be pseudorandom sequence of bits. The spreading code can also be orthogonal spreading code.

In some embodiments, smart speaker 116-2 and audio responsive remote control 124 can agree on a common reference point for correlation using the spreading code. For example, if a reference point for applying the spreading code is the zeroth bit for the zeroth sample, then the spreading code will only match the zeroth audio sample at the zeroth bit. Thus, using an orthogonal spreading code, audio responsive remote control 124 can accurately identify a time of receipt of a particular audio sample from smart speaker 116-2.

Smart speaker 116-2 can transmit a time of transmission of a particular audio sample to audio responsive remote control 124. The time of transmission can be a timestamp of the synchronized clock of smart speaker 116-2 when smart speaker 116-2 sent the particular audio sample to audio responsive remote control 124. For example, smart speaker 116-1 can generate a timestamp of when it sent out the zeroth audio sample to audio responsive remote control 124. Smart speaker 116-2 can then encode the timestamp and send it to audio responsive remote control 124. Smart speaker 116-2 can send the encoded timestamp shortly after transmitting the corresponding audio sample to audio responsive remote control 124. In some embodiments, smart speaker 116-2 can send the encoded timestamp using the audio data channel. In other words, smart speaker 116-2 can send the encoded time stamp using a spread spectrum signal. In some other embodiments, smart speaker 116-1 can send the encoded timestamp over network 114. As would be appreciated by a person of ordinary skill in the art, smart speaker 116-2 can send the encoded timestamp to audio responsive remote control 124 using various other techniques.

By way of example, where the reference point is the zeroth bit for the zeroth audio sample, smart speaker 116-2 can send out the zeroth audio sample followed by a timestamp of the zeroth audio sample. Audio responsive remote control 124 can receive the zeroth audio sample in the spread spectrum signal. Audio responsive remote control 124 can then slide the spreading code over the received audio sample to determine if it is the zeroth audio sample. Audio responsive remote control 124 can have its own timestamp for receipt of the zeroth audio sample.

Audio responsive remote control 124 can determine an airtime delay of smart speaker 116-2 by calculating the difference between the received time of transmission of the zeroth audio sample and its own time of receipt of the zeroth audio sample. As would be appreciated by a person of ordinary skill in the art, media system 102 can calculate the airtime delay of smart speaker 116-2 at any other component in media system 102.

In some embodiments, after calculating the airtime delay, a master device of media system 102 can calculate the distance between audio responsive remote control 124 and smart speaker 116-2. As would be appreciated by a person of ordinary skill in the art, the speed of sound is 340 meters per second. Therefore, the master device calculate the distance between audio responsive remote control 124 and smart speaker 116-2 by multiplying the airtime delay by the speed of sound. As would be appreciated by a person of ordinary skill in the art, the accuracy of the distance calculation can be depend on the microphone sampling rate. For example, with a 48 kHz sampling rate, the distance can be calculated down to approximately 7 mm.

In some embodiments, after calculating the distance from audio responsive remote control 124 to smart speaker 116-2, media system 102 can store the distance for later comparison to determine if smart speaker 116-2 was moved.

Figure 7B:
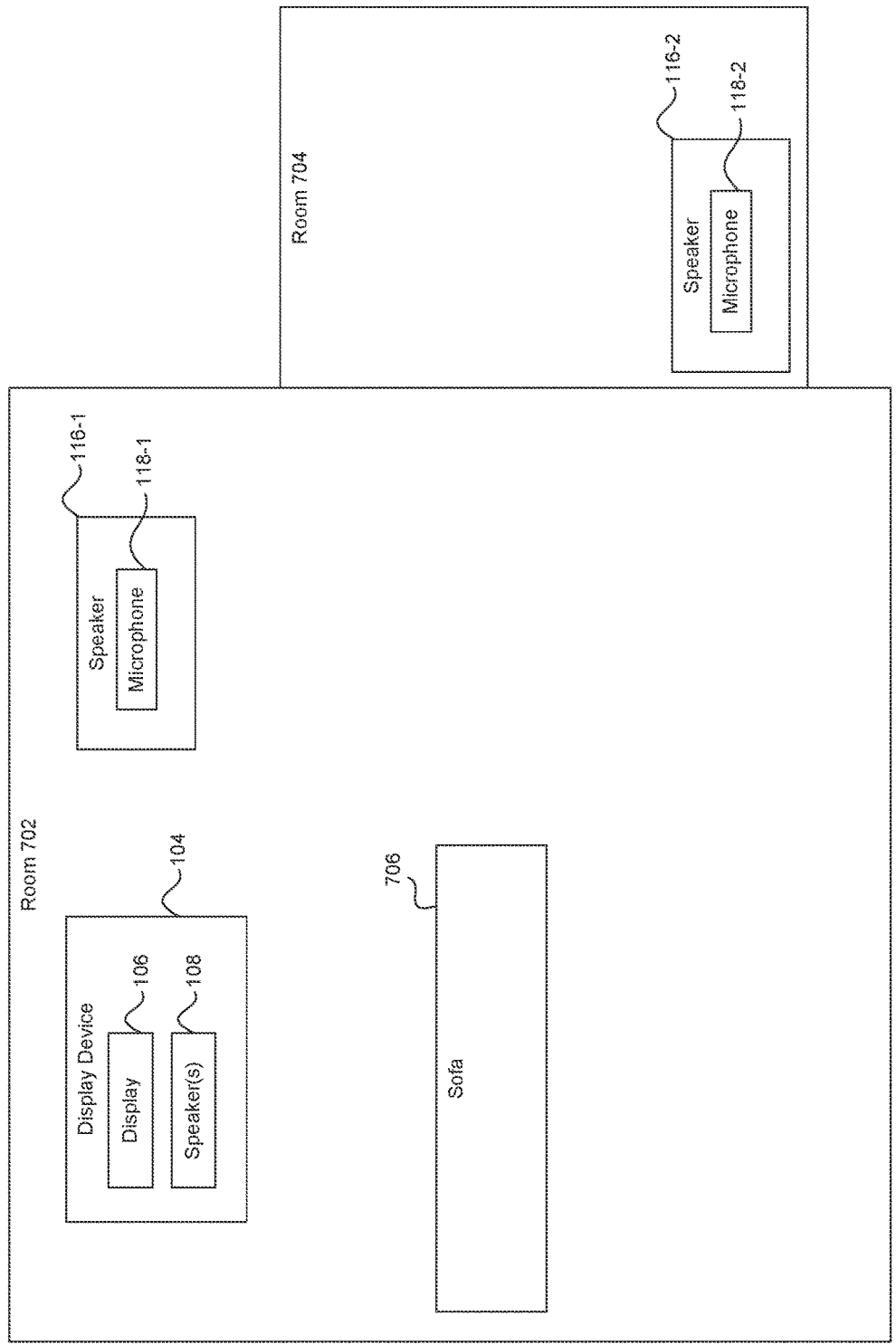
FIG. 7B illustrates a block diagram of a change in speaker configuration for the example media system of FIG. 7A, according to some embodiments.

FIG. 7B illustrates a change in speaker configuration for the example media system of FIG. 7A, according to some embodiments. FIG. 7B illustrates the movement of smart speaker 116-2 from room 702 in FIG. 7A to room 704. FIG. 7B illustrates the determination that smart speaker 116-2 is not in room 702 by recalculating the distance to smart speaker 116-2 and comparing it the previously calculated distance of FIG. 7A. FIG. 7B is discussed with reference to FIG. 1.

In FIG. 7B, sometime after smart speaker 116-2 is moved to room 704, media system 102 can recalculate the distance from audio responsive remote control 124 at sofa 706 to smart speaker 116-2. In some embodiments, this recalculation can be trigged by smart speaker 116-2 leaving and rejoining network 114. For example, smart speaker 116-2 can leave and rejoin network 114 in response to being unplugged from a power source. In some other embodiments, this recalculation can be triggered at periodic intervals (e.g., every 30 minutes). In some other embodiments, this recalculation can be triggered directly by a user.

Once the recalculation is triggered, smart speaker 116-2 can generate an audio base signal. The audio base signal can be a base signal modulated using Binary Phase-shift Keying (BPSK).

After generating the audio base signal, smart speaker 116-2 can continuously apply a spreading code to the audio base signal before outputting the resulting spread spectrum signal to audio responsive remote control 124. Smart speaker 116-2 can apply the spreading code to the audio base signal by multiplying the audio base signal by the spreading code. Smart speaker 116-2 can output the resulting spread spectrum signal to audio responsive remote control 124.

After smart speaker 116-2 plays the spread spectrum signal to audio remote control 124, smart speaker 116-2 transmit a timestamp of its synchronized clock of when a sample is sent out for transmission to audio responsive remote control 124.

In some embodiments, smart speaker 116-2 and audio responsive remote control 124 can agree on a common reference point for correlation using the spreading code. For example, if a reference point for applying the spreading code is the zeroth bit for the zeroth sample, then the spreading code will only match the zeroth audio sample at the zeroth bit. Thus, using an orthogonal spreading code, audio responsive remote control 124 can accurately identify a time of receipt of a particular audio sample from smart speaker 116-2.

Smart speaker 116-2 can transmit a time of transmission of a particular audio sample to audio responsive remote control 124. The time of transmission can be a timestamp of the synchronized clock of smart speaker 116-2 when smart speaker 116-2 sent the particular audio sample to audio responsive remote control 124. For example, smart speaker 116-1 can generate a timestamp of when it sent out the zeroth audio sample to audio responsive remote control 124. Smart speaker 116-2 can then encode the timestamp and send it to audio responsive remote control 124. Smart speaker 116-2 can send the encoded timestamp shortly after transmitting the corresponding audio sample to audio responsive remote control 124. In some embodiments, smart speaker 116-2 can send the encoded timestamp using the audio data channel. In other words, smart speaker 116-2 can send the encoded time stamp using a spread spectrum signal. In some other embodiments, smart speaker 116-1 can send the encoded timestamp over network 114. As would be appreciated by a person of ordinary skill in the art, smart speaker 116-2 can send the encoded timestamp to audio responsive remote control 124 using various other techniques.

By way of example, where the reference point is the zeroth bit for the zeroth audio sample, smart speaker 116-2 can send out the zeroth audio sample followed by a timestamp of the zeroth audio sample. Audio responsive remote control 124 can receive the zeroth audio sample in the spread spectrum signal. Audio responsive remote control 124 can then slide the spreading code over the received audio sample to determine if it is the zeroth audio sample. Audio responsive remote control 124 can have its own timestamp for receipt of the zeroth audio sample.

Audio responsive remote control 124 can determine an airtime delay of smart speaker 116-2 by calculating the difference between the received time of transmission of the zeroth audio sample and its own time of receipt of the zeroth audio sample. As would be appreciated by a person of ordinary skill in the art, media system 102 can calculate the airtime delay of smart speaker 116-2 at any other component in media system 102.

In some embodiments, after calculating the airtime delay, media system 102 can calculate the distance between audio responsive remote control 124 and smart speaker 116-2. Specifically, as would be appreciated by a person of ordinary skill in the art, the speed of sound is 340 meters per second. Media system 102 can calculate the distance between audio responsive remote control 124 and smart speaker 116-2 by multiplying the airtime delay by the speed of sound. As would be appreciated by a person of ordinary skill in the art, the accuracy of the distance calculation can be depend on the microphone sampling rate. For example, with a 48 kHz sampling rate, the distance can be calculated down to approximately 7 mm.

In some embodiments, media system 102 can calculate a change of distance between the newly calculated distance and the initial distance calculated between audio responsive remote control 124 and smart speaker 116-2 in FIG. 7A. If the change of distance is greater than a threshold value, media system 102 can determine that smart speaker 116-2 is in a new room (e.g., room 704). Media system 102 can then readjust playback at smart speaker 116-2.

In some embodiments, the threshold value can be a fixed distance measurement. In some other embodiments, the threshold value can be based on initially calculated distance. For example, the threshold value may be a certain percentage of the initially calculated distance (e.g., 150%).

After determining that the change of distance is greater than the threshold value, media system 102 can change the listening experience for room 702. For example, media system 102 can stop playing back audio content on smart speaker 116-2. Media system 102 can also readjust a sweet spot calculation based on smart speaker 116-2 not being present in room 702 anymore as discussed above. As would be appreciated by a person of ordinary skill in the art, media system 102 can perform various other adjustments in view of smart speaker 116-2 being moved to a new room (e.g., room 704). Moreover, as would be appreciated by a person of ordinary skill in the art, these adjustments may be based on user defined settings.

Figure 8:
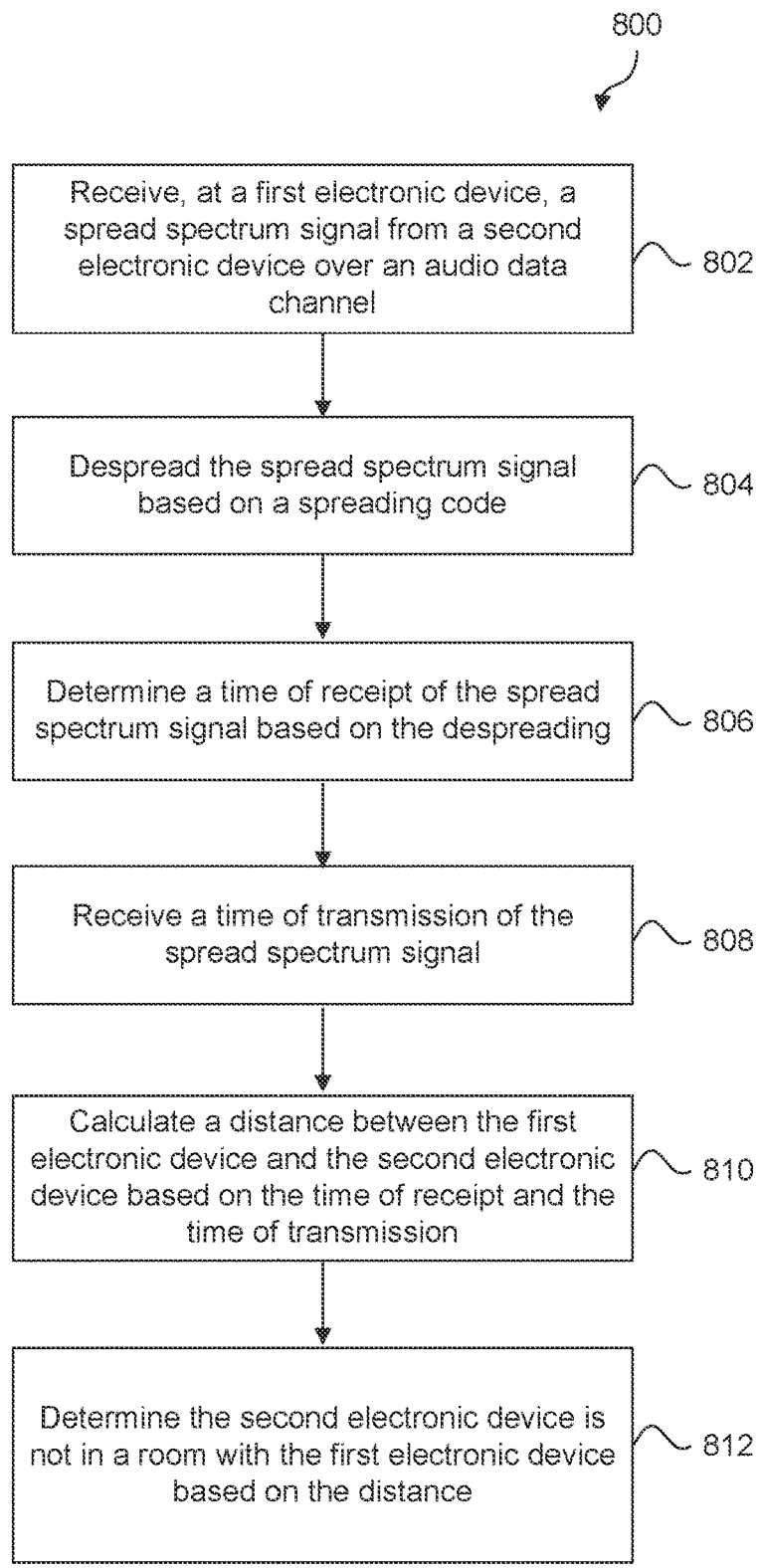
FIG. 8 illustrates a flowchart for automatically detecting a change in speaker configuration in a room, according to some embodiments.

FIG. 8 illustrates a method 800 for automatically detecting a change in speaker configuration in a room, according to some embodiments. Method 800 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIGS. 1, 7A, and 7B, as will be understood by a person of ordinary skill in the art.

For illustrative and non-limiting purposes, method 800 shall be described with reference to FIGS. 1, 7A, and 7B. However, method 800 is not limited to those examples.

In 802, a first electronic device (e.g., audio responsive remote control 124) receives a spread spectrum signal from a second electronic device (e.g., smart speaker 116-2). The spread spectrum signal is received over an audio data channel. In some embodiments, the first electronic device receives the spread spectrum signal at boot up of the second electronic device. In some other embodiments, the first electronic device receives the spread spectrum signal in response to a user command.

In 804, the first electronic device despreads the spread spectrum signal based on a spreading code. The spreading code can be exchanged between the first electronic device and the second electronic device in advance of 802. The first electronic device despreads the spread spectrum signal based on a reference point associated with the spreading code. For example, the first electronic device can despread based on sample 0. The first electronic device can perform the despread using a sliding window.

In 806, the first electronic device determines a time of receipt of the spread spectrum signal based on the despreading.

In 808, the first electronic device receives a time of transmission of the spread spectrum signal from the second electronic device. In some embodiments, the first electronic device can receive the time of transmission of the spread spectrum signal over an audio data channel. In some other embodiments, the first electronic device can receive the time of transmission of the spread spectrum signal over network 114 using a wireless communication protocol.

In 810, a master device (e.g., the first electronic device) calculates a distance between the first electronic device and the second electronic device based on the time of receipt and the time of transmission. The master device can calculate the distance between audio responsive remote control 124 and smart speaker 116-2 by multiplying the airtime delay (e.g., the difference between the received time of transmission of a particular audio sample and the time of receipt of the audio sample) by the speed of sound.

In 812, the master device (e.g. the first electronic device) determines the second electronic device is not in room based on the distance. For example, in some embodiments, the master device can calculate a change of distance between the calculated distance and a previously stored initial distance between the first electronic device and the second electronic device. If the change of distance is greater than a threshold value, the master device can determine that the second electronic device is in a new room (e.g., room 704). The master device can then readjust playback at the second electronic device.

Example Computer System

Figure 9:
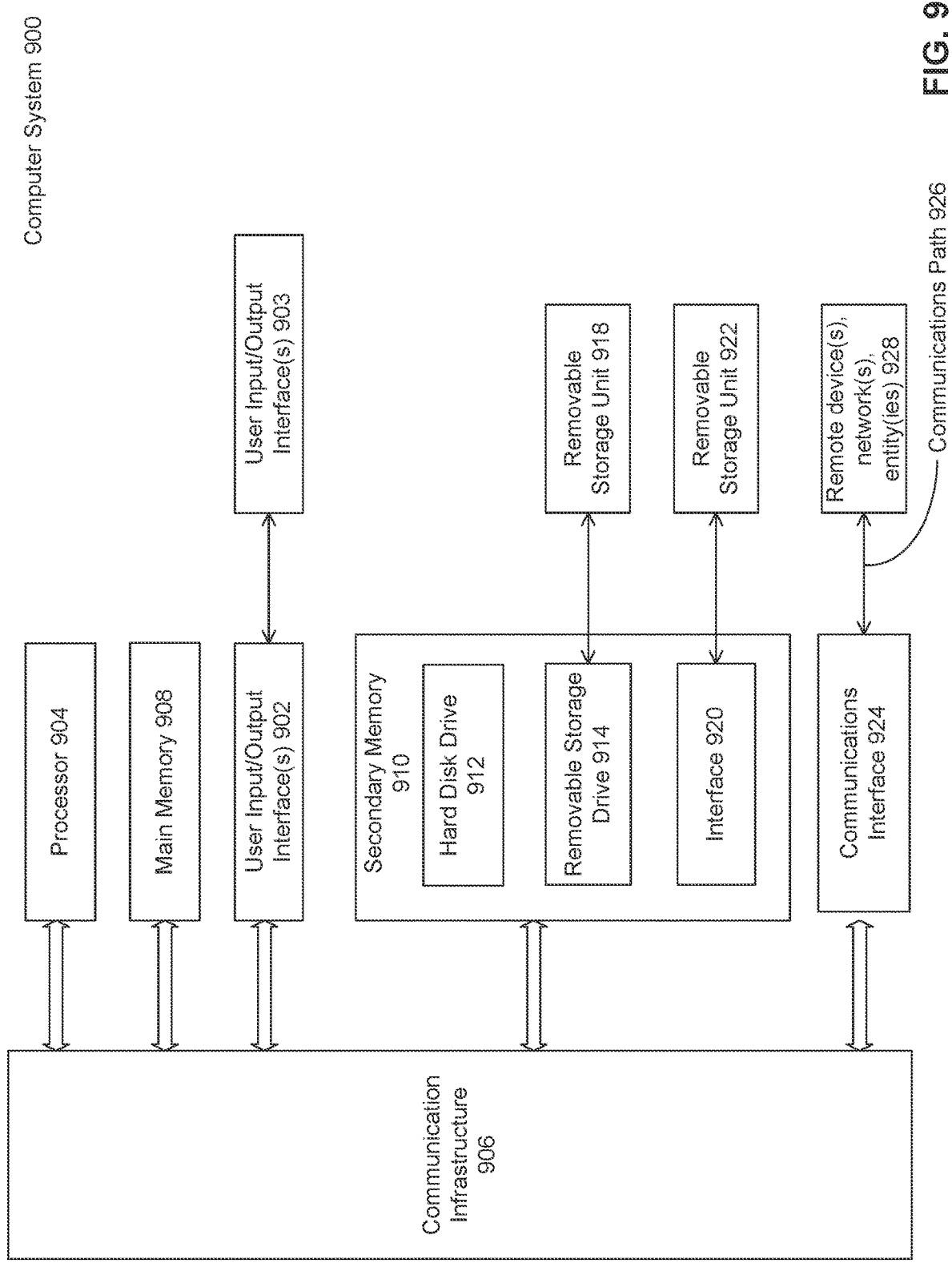
FIG. 9 is an example computer system useful for implementing various embodiments.

Various embodiments and/or components therein can be implemented, for example, using one or more computer systems, such as computer system 900 shown in FIG. 9. Computer system 900 can be any computer or computing device capable of performing the functions described herein. Computer system 900 includes one or more processors (also called central processing units, or CPUs), such as a processor 904. Processor 904 is connected to a communication infrastructure or bus 906.

One or more processors 904 can each be a graphics processing unit (GPU). In some embodiments, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 900 also includes user input/output device(s) 903, such as monitors, keyboards, pointing devices, etc., that communicate with communication infrastructure 906 through user input/output interface(s) 902.

Computer system 900 also includes a main or primary memory 908, such as random access memory (RAM). Main memory 908 can include one or more levels of cache. Main memory 908 has stored therein control logic (i.e., computer software) and/or data.

Computer system 900 can also include one or more secondary storage devices or memory 910. Secondary memory 910 can include, for example, a hard disk drive 912 and/or a removable storage device or drive 914. Removable storage drive 914 can be a floppy disk drive, a magnetic tape drive, a compact disk drive, an optical storage device, tape backup device, and/or any other storage device/drive.

Removable storage drive 914 can interact with a removable storage unit 918. Removable storage unit 918 includes a computer usable or readable storage device having stored thereon computer software (control logic) and/or data. Removable storage unit 918 can be a floppy disk, magnetic tape, compact disk, DVD, optical storage disk, and/any other computer data storage device. Removable storage drive 914 reads from and/or writes to removable storage unit 918 in a well-known manner.

According to an exemplary embodiment, secondary memory 910 can include other means, instrumentalities or other approaches for allowing computer programs and/or other instructions and/or data to be accessed by computer system 900. Such means, instrumentalities or other approaches can include, for example, a removable storage unit 922 and an interface 920. Examples of the removable storage unit 922 and the interface 920 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 can further include a communication or network interface 924. Communication interface 924 enables computer system 900 to communicate and interact with any combination of remote devices, remote networks, remote entities, etc. (individually and collectively referenced by reference number 928). For example, communication interface 924 can allow computer system 900 to communicate with remote devices 928 over communications path 926, which can be wired and/or wireless, and which can include any combination of LANs, WANs, the Internet, etc. Control logic and/or data can be transmitted to and from computer system 900 via communication path 926.

In some embodiments, a tangible apparatus or article of manufacture comprising a tangible computer useable or readable medium having control logic (software) stored thereon is also referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 9. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for synchronizing playback of audiovisual content, comprising:
   transmitting, at a display device, a spread spectrum signal to a dumb speaker over a data channel at a time of transmission, wherein the spread spectrum signal is based on a spreading code;
   receiving, at the display device, the spread spectrum signal played back auditorily by the dumb speaker, wherein the spread spectrum signal played back auditorily by the dumb speaker represents an input from a microphone at an electronic device;
   despreading, at the display device, the spread spectrum signal from the dumb speaker based on the spreading code;
   determining, at the display device, a time of receipt of the spread spectrum signal from the dumb speaker based on the despreaded spread spectrum signal;
   calculating, at the display device, an audiovisual output path delay for the dumb speaker based on the time of receipt of the spread spectrum signal and the time of transmission of the spread spectrum signal, wherein the audiovisual output path delay comprises a time delay between receiving the spread spectrum signal at the dumb speaker and the spread spectrum signal being played back auditorily by the dumb speaker; and
   synchronizing, at the display device, the playback of the audiovisual content at the dumb speaker and the display device based on the audiovisual output path delay of the dumb speaker.

2. The computer-implemented method of claim 1, wherein the data channel comprises an audio jack channel, a Radio Corporation of America (RCA) channel, an optical channel, or a High-Definition Multimedia Interface (HDMI) channel.

3. The computer-implemented method of claim 1, the despreading further comprising:
   despreading the spread spectrum signal from the dumb speaker based on a reference point associated with the spreading code.

4. The computer-implemented method of claim 3, the despreading further comprising:
   selecting a sliding window into the spreading code based on the reference point; and
   despreading the spread spectrum signal from the dumb speaker based on the sliding window.

5. The computer-implemented method of claim 1, further comprising:
changing, at the display device, an amount of the audiovisual content to a buffer based on the audiovisual output path delay.

6. The computer-implemented method of claim 1, further comprising:
updating, at the display device, a playback offset for the audiovisual content based on the audiovisual output path delay.

7. The computer-implemented method of claim 1, wherein the electronic device is a remote control or a smart speaker.

8. A system, comprising:
a memory; and
at least one processor coupled to the memory and configured to:
transmit a spread spectrum signal to a dumb speaker over a data channel at a time of transmission, wherein the spread spectrum signal is based on a spreading code;
receive the spread spectrum signal played back auditorily by the dumb speaker, wherein the spread spectrum signal played back auditorily by the dumb speaker represents an input from a microphone at an electronic device;
despread the spread spectrum signal from the dumb speaker based on the spreading code;
determine a time of receipt of the spread spectrum signal from the dumb speaker based on the despreaded spread spectrum signal;
calculate an audiovisual output path delay for the dumb speaker based on the time of receipt of the spread spectrum signal and the time of transmission of the spread spectrum signal, wherein the audiovisual output path delay comprises a time delay between receiving the spread spectrum signal at the dumb speaker and the spread spectrum signal being played back auditorily by the dumb speaker; and
synchronize playback of audiovisual content at the dumb speaker and the system based on the audiovisual output path delay of the dumb speaker.

9. The system of claim 8, wherein the data channel comprises an audio jack channel, a Radio Corporation of America (RCA) channel, an optical channel, or a High-Definition Multimedia Interface (HDMI) channel.

10. The system of claim 8, wherein to despread, the at least one processor is further configured to:
despread the spread spectrum signal from the dumb speaker based on a reference point associated with the spreading code.

11. The system of claim 10, wherein to despread, the at least one processor is further configured to:
select a sliding window into the spreading code based on the reference point; and
despread the spread spectrum signal from the dumb speaker based on the sliding window.

12. The system of claim 8, wherein the at least one processor is further configured to:
change an amount of the audiovisual content to a buffer based on the audiovisual output path delay.

13. The system of claim 8, wherein the at least one processor is further configured to:
change a playback offset for the audiovisual content based on the audiovisual output path delay.

14. The system of claim 8, wherein the electronic device is a remote control or a smart speaker.

15. A non-transitory computer-readable medium having instructions stored thereon that, when executed by at least one computing device, cause the at least one computing device to perform operations comprising:
transmitting a spread spectrum signal to a dumb speaker over a data channel at a time of transmission, wherein the spread spectrum signal is based on a spreading code;
receiving the spread spectrum signal played back auditorily by the dumb speaker, wherein the spread spectrum signal played back auditorily by the dumb speaker represents an input from a microphone at an electronic device;
despreading the spread spectrum signal from the dumb speaker based on the spreading code;
determining a time of receipt of the spread spectrum signal from the dumb speaker based on the despreaded spread spectrum signal;
calculating an audiovisual output path delay for the dumb speaker based on the time of receipt of the spread spectrum signal and the time of transmission of the spread spectrum signal, wherein the audiovisual output path delay comprises a time delay between receiving the spread spectrum signal at the dumb speaker and the spread spectrum signal being played back auditorily by the dumb speaker; and
synchronizing playback of audiovisual content at the dumb speaker and the computing device based on the audiovisual output path delay of the dumb speaker.

16. The non-transitory computer-readable medium of claim 15, wherein the data channel comprises an audio jack channel, a Radio Corporation of America (RCA) channel, an optical channel, or a High-Definition Multimedia Interface (HDMI) channel.

17. The non-transitory computer-readable medium of claim 15, the despreading comprising:
despreading the spread spectrum signal from the dumb speaker based on a reference point associated with the spreading code.

18. The non-transitory computer-readable medium of claim 15, wherein the operations further comprise:
changing an amount of the audiovisual content to a buffer based on the audiovisual output path delay.

19. The non-transitory computer-readable medium of claim 15, wherein the operations further comprise:
changing a playback offset for the audiovisual content based on the audiovisual output path delay.

20. The non-transitory computer-readable medium of claim 15, wherein the electronic device is a remote control or a smart speaker.

* * * * *